US012471572B2

(12) United States Patent
Cook et al.

(10) Patent No.: US 12,471,572 B2
(45) Date of Patent: Nov. 18, 2025

(54) ENERGY-BASED ANIMAL NUTRITION MODELING AND FORMULATION SYSTEMS

(71) Applicant: CAN TECHNOLOGIES, INC., Wayzata, MN (US)

(72) Inventors: David A. Cook, Coon Rapids, MN (US); Christian De Santis, Lombardy (IT); Adel El-Mowafi, Hafrsfjord (NO); Brian J. Knudson, Chanhassen, MN (US); Kari Juhani Ruohonen, Turku (FI)

(73) Assignee: CAN TECHNOLOGIES, INC., Wayzata, MN (US)

( * ) Notice: Subject to any disclaimer, the term of this patent is extended or adjusted under 35 U.S.C. 154(b) by 238 days.

(21) Appl. No.: 18/552,248

(22) PCT Filed: Mar. 17, 2022

(86) PCT No.: PCT/US2022/071205
§ 371 (c)(1),
(2) Date: Sep. 25, 2023

(87) PCT Pub. No.: WO2022/204656
PCT Pub. Date: Sep. 29, 2022

(65) Prior Publication Data
US 2024/0180124 A1 Jun. 6, 2024

Related U.S. Application Data

(60) Provisional application No. 63/166,787, filed on Mar. 26, 2021.

(51) Int. Cl.
*A01K 29/00* (2006.01)
*A01K 5/02* (2006.01)
(Continued)

(52) U.S. Cl.
CPC .............. *A01K 29/005* (2013.01); *A01K 5/02* (2013.01); *A23K 50/10* (2016.05); *A23K 50/30* (2016.05); *A23K 50/75* (2016.05); *A23K 50/80* (2016.05)

(58) Field of Classification Search
CPC ........ A01K 29/005; A01K 5/02; A01K 67/02; A23K 50/10; A23K 50/30; A23K 50/75; A23K 50/80
(Continued)

(56) References Cited

U.S. PATENT DOCUMENTS 6,076,043 A * 6/2000 Liu ...................... A01K 29/00
702/179
10,242,369 B2 3/2019 Klavins
(Continued)

FOREIGN PATENT DOCUMENTS

EP 2208415 A1 7/2010
WO 2007016106 A2 2/2007
(Continued)

OTHER PUBLICATIONS

1st Friday, Nuevo Portafolio: alimentos disenados, origen de la nutricion para salmonidos. Sep. 2020, 31 pages. Virtual Workshop Lecture presented in Chile.
(Continued)

*Primary Examiner* — Eric Blount

(57) ABSTRACT

Disclosed are various approaches for determining an animal feed formulation. In some implementations, a system may obtain data that provides characteristics of an animal population located at a site. The system may identify a target growth schedule for the animal population. The system may use a data processing model to predict nutrition requirements for tissue growth in the animal population, using the target growth schedule and the characteristics of the animal
(Continued)

population, as the model predicts nutrition requirements based on projected nitrogenous energy requirements for the tissue growth. The system may identify a feed formulation producible from a combination of animal feed ingredients to satisfy the nutrition requirements for tissue growth. The system may generate a data output for use of the feed formulation with the animal population, the data output indicating the identified feed formulation producible from the combination of animal feed ingredients.

20 Claims, 15 Drawing Sheets

(51) Int. Cl.
*A23K 50/10* (2016.01)
*A23K 50/30* (2016.01)
*A23K 50/75* (2016.01)
*A23K 50/80* (2016.01)

(58) Field of Classification Search
USPC .................................................. 340/573.3
See application file for complete search history.

(56) References Cited

U.S. PATENT DOCUMENTS

| | | | |
|---|---|---|---|
| 2002/0120402 A1 | 8/2002 | Burghardi | |
| 2003/0233984 A1 | 12/2003 | van de Ligt | |
| 2004/0118351 A1 | 6/2004 | Newcomb | |
| 2005/0257748 A1 | 11/2005 | Kriesel | |
| 2006/0036419 A1 | 2/2006 | Cook | |
| 2018/0350010 A1 | 12/2018 | Kuper | |

FOREIGN PATENT DOCUMENTS

| | | |
|---|---|---|
| WO | 2020051176 A1 | 3/2020 |
| WO | 2023/114903 A1 | 6/2023 |

OTHER PUBLICATIONS

Azevedo et al., "Comparing efficiency of metabolizable energy utilization by rainbow trout (*Oncorhynchus mykiss*) and Atlantic salmon (*Salmo salar*) using factorial and multivariate approaches", J Anim Sci 2005, 83:842-851.

Bohnes et al., "Environmental impacts of existing and future aquaculture production: Comparison of technologies and feed options in Singapore" , Aquaculture, Elsevier, Amsterdam, NL, vol. 532, Oct. 5, 2020, 17 pages.

Cortes et al., "Eco-efficiency assessment of shrimp aquaculture production in Mexico", Aquaculture, Elsevier, Amsterdam, NL, vol. 544, Jul. 6, 2021, 10 pages.

Heidari et al., "Proposing a framework for sustainable feed formulation for laying hens: A systematic review of recent developments and future directions" Journal of Cleaner Production, Elsevier, Amsterdam, NL, vol. 288, Dec. 22, 2020, 21 pages.

Miles et al., "The Concept of Ideal Protein in Formulation of Aquaculture Feeds", IFAS Extension, University of Florida, FA144, Mar. 2007, 4 pages.

Schrama et al., "Energy efficiency of digestible protein, fat and carbohydrate utilisation for growth in rainbow trout and Nile tilapia", British Journal of Nutrition (2018), 119, 782-791.

* cited by examiner

ENERGY-BASED ANIMAL NUTRITION MODELING AND FORMULATION SYSTEMS

CROSS-REFERENCE TO RELATED APPLICATIONS

This application is a national phase of International Patent Application No. PCT/US2022/071205, filed Mar. 17, 2022, which claims the benefit of U.S. Provisional Application No. 63/166,787, filed Mar. 26, 2021, each of which is incorporated by reference herein in its entirety.

BACKGROUND

Animal production, whether involving land-based animals (e.g., cattle, swine, sheep, or poultry) or aquatic animals (e.g., fish, shrimp, crocodilians, etc.), is closely tied to the delivery, timing, and composition of feed formulations. Extensive research has been performed to evaluate the nutritional requirements for different animals, particularly during periods of body growth as animals develop to reach maturity. Many types of feeds and feed formulations have been developed to meet these nutritional requirements, often on the basis of a feed conversion ratio (e.g., the amount of feed estimated to be converted into growth), and the estimated energy needs to produce growth in animal muscle or fat tissue at a desired rate.

Even with detailed nutritional analysis, research has shown that an increase in nutritional ingredients and nutritional availability does not necessarily lead to improved tissue growth or desired growth outcomes. For instance, increasing the amount of protein in a food supply does not necessarily lead to an increase in the metabolizing of such protein by growing animals. Rather, many interrelated physiological factors have an effect on how fast and how many nutritional ingredients are metabolized and converted into different types of energy for the animal. As a result, feed formulations that are offered to animals often provide too much or too little of nutritional elements, leading to waste, delayed growth, unintended growth (e.g., conversion into fat tissue instead of muscle tissue), and other inefficiencies.

DETAILED DESCRIPTION

Figure 1:
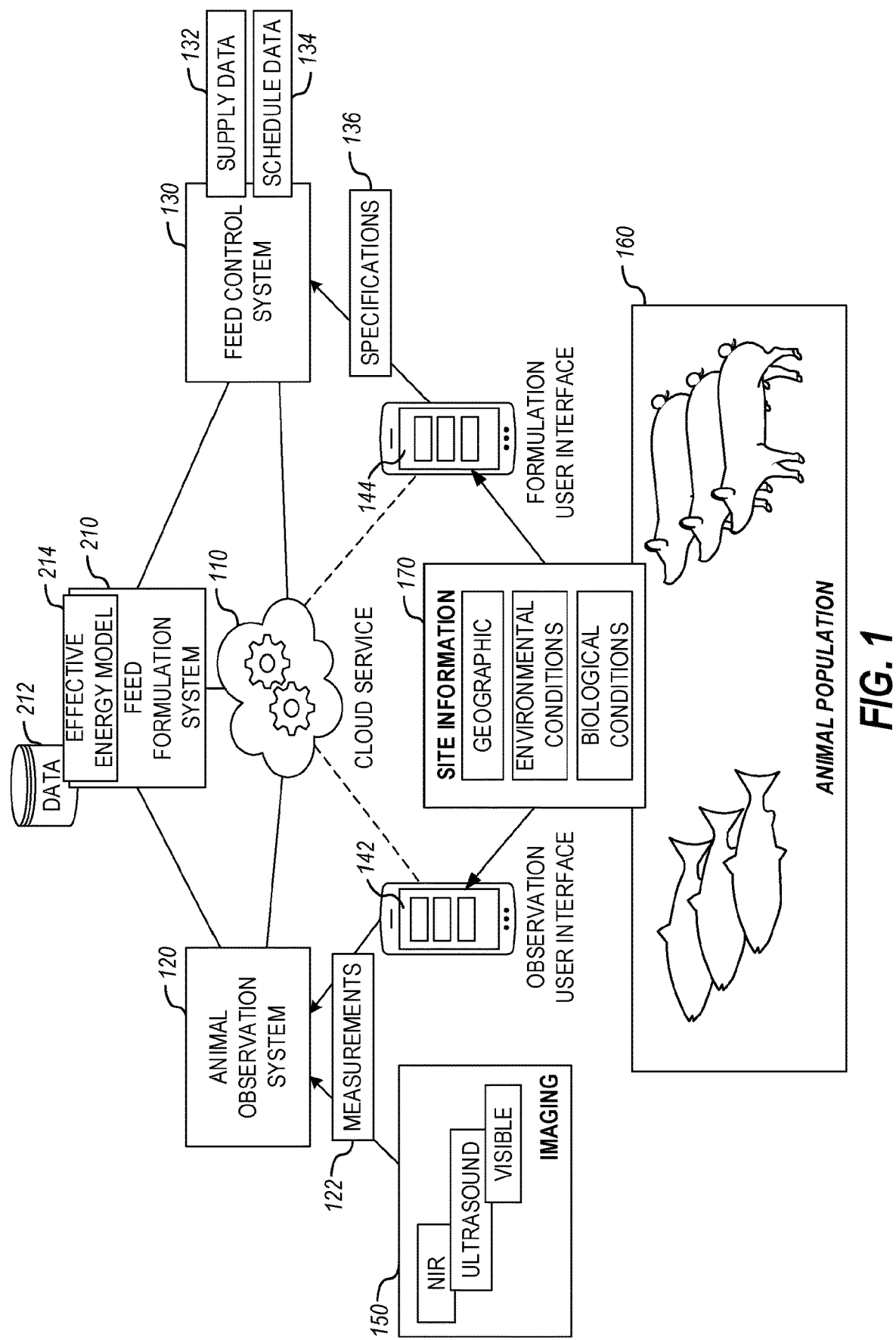
FIG. 1 illustrates the use of systems for animal nutrition modeling and formulation, according to an example.

The following provides a description of data processing systems that include and use dynamical models for the measurement, evaluation, computation, and control of animal feed formulations. In an example, a dynamic model predicts the energy provided by an animal feed diet for a particular animal population based on fractionating the different energy-bearing nutrients of the animal feed. In particular, nitrogen may be separated into an essential nitrogen measurement which is utilized in the animal for protein synthesis and a nonessential nitrogen measurement which is utilized in the animal for energy production. This dynamic model may operate on a variety of real-world data inputs, such as animal measurements, geographical and environmental conditions, physiological conditions, and the like for a particular animal or animal population. Also in an example, the energy information produced from the dynamic model may be used to identify, create, or change feed formulations. For instance, the energy content of individual ingredients and nutrients may be newly and dynamically determined for feeding a particular animal or animal population.

Based on the prediction of energy, one or more customized feed formulations and a schedule of the feed formulations may be developed for a particular animal or population, including the development of different compositions of batches of feeds that are mixed and fed to the particular animal population. The feed formulations and schedule may be dynamically changed or updated, based on additional observations of growth, variation from forecasted environmental conditions, changes in availability or pricing of feed ingredients, or other changed factors. The data processing system enables a closed-loop monitoring and adaptation approach to precisely control feed formulations on an ongoing basis.

In various examples, a measurement and modeling of "effective energy" and its components is made in order to determine appropriate feed formulations that support growth of the animal. Such a measurement may be represented by a value, pool, ratio, or fraction. In this context, effective energy describes how much energy which is derived from a food source is applied towards tissue growth. Effective energy may be further broken down into separate measurements of protein growth and fat growth. As has been observed in many settings for many animals, the ratio of protein and fat growth varies based on a variety of factors, including as seasonality (e.g., summer versus winter), sunlight (latitude), temperature, environmental factors, genetics, biological conditions, and the like.

The dynamic models described herein are adapted to consider these considerations and to provide a new energy model for evaluating the amounts and ratios of energy from feed which are applied to tissue growth or consumed for metabolic and physiological activities. Within this energy model, considerations are made for digestible versus non-digestible energy; within the considerations for digestible energy, further considerations are made for nitrogenous versus non-nitrogenous digestible energy; and within the considerations for nitrogenous digestible energy, further considerations are made for "essential" nitrogen versus non-essential nitrogen. This measurement of essential nitrogen represents an optimal amount and ratio of nitrogenous compounds needed by the animal, in a given physiological state, to achieve maximum synthesis and deposition of tissue. As discussed in more detail below, nitrogenous compounds provided in a diet which are in demand for muscle tissue growth and key physiological activities—whether provided by amino acids, vitamins, or other feed components—are classified as essential nitrogen; whereas nitrogenous compounds which exceed demand and provide an excess supply for fat tissue and energy—whether provided by these same or different amino acids, vitamins, or other feed components—are classified as non-essential nitrogen.

A variety of technical mechanisms are disclosed for the present data processing system and dynamical models. These include, but are not limited to, the use of: electronic imaging systems to obtain measurements of an animal population; user interfaces and application programming to receive data inputs, including environmental conditions, specifications, real-world observations, and feed formulation information; cloud services to host and execute instances of the dynamic models and operational data stores; control systems to formulate, mix, schedule, and deliver feed formulations; and client or server computer systems to implement software to perform these and other functional operations. Among other features, the technical and real-world benefits of these systems includes; improved development and customization of feed formulations; reduced waste and environmental emissions from animal production settings; improved quality of animal health and animal meat production; and improved accuracy in modeling leading to a decreased need for remedial or corrective measures in feed scheduling.

The following examples are discussed with reference to feed formulations developed for certain classes of animals, such as fish and swine. It will be understood, however, that the techniques discussed herein may be applicable to a variety of types of animals such as monogastric, ruminant, livestock, or aquatic animals, including specific classes of animals raised for meat production purposes, such as fish, crustaceans, swine, sheep, goats, cattle, bison, or poultry (e.g., chickens, turkeys, etc.). Further, the techniques discussed herein may be applicable to developing feed formulations of other classes of animals which can be raised in production settings but are not necessarily harvested for meat production, such as horses, donkeys, llamas, birds, dogs, cats, dairy animals, laying hens, and the like. Additionally, the techniques for animal growth and feed formulation may be applicable to other classes and types of animals, including companion animals (including horses), lactating and gestating females (e.g. dairy cows) and egg producers (laying hens and breeders), with growth relating to a variety of storage proteins including but not limited to muscle, milk, eggs, or a fetus.

FIG. 1 illustrates the use of example systems for animal nutrition modeling and formulation. In this example, a feed formulation system 210 operates an effective energy model 214 which dynamically identifies nutritional requirements and formulation recommendations based on the evaluation of animal and feed data 212 to evaluate essential nitrogenous energy that produces tissue growth ("effective energy"). The operation and structure of the effective energy model 214 and is described in more detail with reference to FIGS. 4 to 7, below.

In an example, the compilation of the animal and feed data 212 is provided based on inputs provided for a particular animal population 160, based on measurements 122 obtained with an animal observation system 120. The animal observation system 120 may obtain the measurements 122 from one or more imaging mechanisms 150 which identify a current physiological condition (e.g., weight, size, etc.) of the animal population 160 using non-invasive measurements. For example, a near-infrared (NIR) or ultrasound imaging sensor may use spectral scanning to perform measurements of muscle or fat tissues. As another example, visible imaging (e.g., using RGB cameras) may produce images that identify characteristics of the body shape or composition of the animal, or identify features such as disease, damage or injury, etc. Other forms of non-invasive monitoring (e.g., weight, size measurements, etc.) may be provided with electrical, mechanical, or human-controlled mechanisms.

The animal observation system 120 may also obtain the measurements 122 from an observation user interface 142, such as a user interface operating on a mobile computing device operated by a human user (e.g., an operator or employee associated with care of the animal population). For instance, the human user may provide inputs into the observation user interface 142 indicating site information 170 relevant to the animal population 160. Such site information 170 may include, but is not limited to: geographic information or measurements; environmental conditions or measurements; biological conditions or measurements; and the like.

The animal population 160 consists of a class or type of animals which are raised at a defined site. A site or a production site as used interchangeably herein is not limited to a confined area such as a feedlot or aquaculture pool, but may include larger areas of free range or waters in which an animal population may be controlled and raised. The characteristics of the animal population 160 and how such a population responds to a feed formulation may be closely tied to the geographic location or attributes, environmental conditions, and biological conditions of the site and the animal population itself. These characteristics are considered by the effective energy model 214 when identifying appropriate feed formulations and feed schedules.

The animal observation system 120 provides the measurements 122 to the feed formulation system 210 to evaluate nutritional requirements and effective energy consumption for the animal population 160. For instance, based on a specified growth target for the animal population, the feed formulation system 210 may analyze different feed formulations, composed from different feed ingredients, to identify which materials will provide an optimum tissue growth to encourage a desired tissue composition at a desired growth rate. Such growth is not necessarily linear, but may occur with different formulations at different ages in the lifecycle of the animal population, and based on properties or characteristics of the site such as seasonality or temperature. Thus, different amounts, types, and schedules of feeds may be calculated.

The feed formulation system 210 may analyze data relating to feed ingredients which are provided by a feed control system 130 or another feed information source. For instance, the feed control system 130 may include supply data 132 which indicates the type and amount of individual nutritional ingredients for a feed mix, and schedule data 134 which indicates availability and cost of individual ingredients or groupings of ingredients. The feed formulation may select or analyze the supply data 132, the schedule data 134, based on specifications 136. For example, the specifications 136 may indicate restrictions or preferences on the ingredients that are available for use and formulation at the production site. Other information associated with an animal producer, customer, or production location may also be used to specify the supply data 132, the schedule data 134, and aspects of the site information 170.

The feed control system 130 may also obtain the specifications 136 from an observation user interface 142, such as a user interface operating on a mobile computing device operated by a human user (e.g., the same or different operator or employee associated with care of the animal population). The specifications 136 may also be provided from a feed supplier or market, and be tied to ingredient availability and price. Some or all of the site information 170 may also be input into or selected with the formulation user interface 144, such as to identify materials which are available at the geographic location for use at the site.

In an example, the feed formulation system 210 generates recommended feed formulations based on satisfaction of nutritional requirements and an optimized schedule of effective energy from use of nitrogenous digestible components. However, other factors such as feed materials availability, cost, environmental effects, and the like may also drive the feed formulation and ingredient recommendations. Further discussion of how the feed formulation system 210 uses data 212 and the effective energy model 214 is provided in more detail below.

Any of the systems 120, 210, 130 may be computer-implemented or computer-controlled, such as via a cloud service 110 which executes services and processes for the respective systems and manages requests and storage for the associated data. Further, although systems 120, 130, and 210 are separately illustrated in FIG. 1, such systems may be incorporated as part of a single service or location, and may be incorporated into aspects of a single feed formulation system. Further discussion of example data processing systems and components of such computing systems is provided in more detail below.

Figure 2:
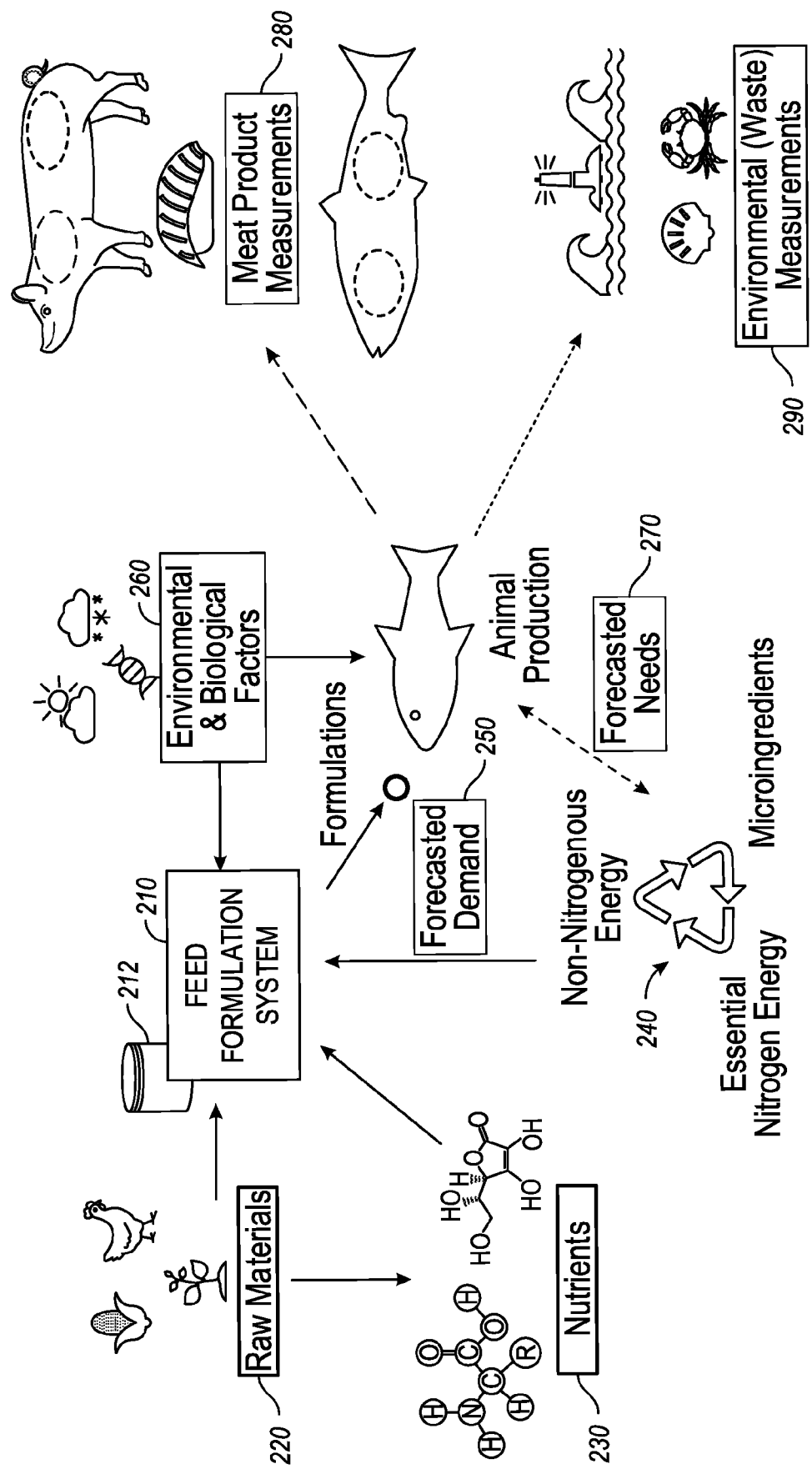
FIG. 2 illustrates a block diagram of functional components involved in a feed formulation system for animal production, according to an example.

FIG. 2 illustrates the use of the feed formulation system 210 for animal production. This block diagram provides additional detail on the functional components and data involved with the feed formulation system 210 in developing feed formulations for animal production. The feed formulation system 210 identifies or obtains data associated with raw materials 220, and the constituent nutrients 230 provided by the raw materials 220 and combinations of the raw materials. Such nutrients may include compositions of amino acids, lipids, glucose, vitamins, and minerals, provided by the nutrients and combinations of nutrients. Although the feed formulation system 210 may primarily evaluate the nutrients 230 in the context of relationships within digestible energy, other nutrients and relationships may also be evaluated.

The feed formulation system 210 identifies or obtains data for a forecasted demand 250 for growth and energy needs of the animal production. This may include a consideration of "essential" energy based on the digestible energy relationships 240 among non-effective energy (non-nitrogenous digestible energy), effective energy (nitrogenous digestible energy), and microingredients. To identify the forecasted demand 250, a set of forecasted needs 270 for the particular animal population is considered by the feed formulation system 210.

To identify the forecasted needs, the feed formulation system 210 also identifies or obtains data relating to environmental and biological factors 260, which affect the growth cycle, usage, and demand of energy. For instance, in the production of aquaculture such as fish, seasonality provides direct changes in sunlight, water temperature that has an impact on how much energy is needed for basic metabolism and physiological activities. Also for instance, in the production of swine, a genetic makeup (e.g., associated with the swine breed or type) may have an effect on the overall size and rate at which individual hogs will grow.

The feed formulation system 210 may develop the formulations and calculate the forecasted needs 270 and demand 250 in the context of tissue growth for muscle and fat tissue of meat products. Such tissue growth may be correlated to meat product measurements 280, such as meat size and composition measurements from harvested animals at maturity. These measurements may be obtained from measurements of live animals during growth. A target tissue composition (e.g., fat ratio) may also be considered and evaluated in encouraging and scheduling tissue growth.

The feed formulation system 210 may also develop the formulations and calculate the forecasted needs 270 and demand 250 in the context of byproducts or second order effects, such as environmental measurements 290. For instance, the deployment of certain nutrients or materials may result in increased waste discharge and waste byproducts (including increased nitrogen or phosphorus released into water). The feed formulation system 210 may consider the environmental outcomes and provide different rations, feeding methods, and formulations for ongoing or forecasted feeding programs.

Figure 3:
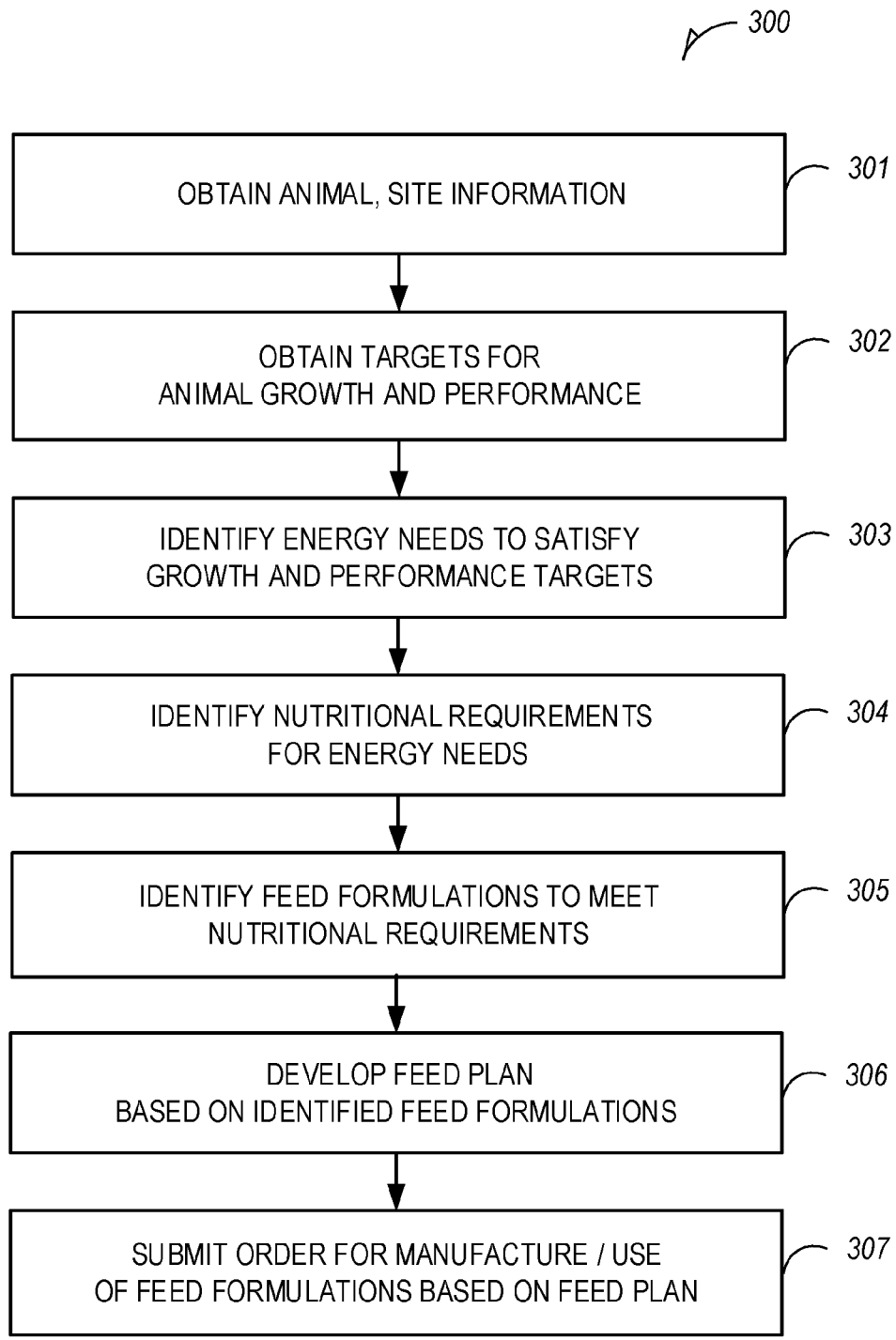
FIG. 3 illustrates a flowchart of a method for developing feed formulations, according to an example.

FIG. 3 illustrates a flowchart of a method 300 for developing feed formulations, which may be implemented by the feed formulation system 210 and other data processing components discussed herein. This flowchart is structured from the perspective of data that is collected and processed by the feed formulation system 210; however, it will be understood that other intermediate actors or systems may also be involved.

At operation 301, information is obtained for animal and site characteristics. This information may be obtained using the user interface inputs or automated measurements discussed above. Site characteristics may include air temperature, humidity, wind or air speed, air quality (e.g., ammonia, dust, etc.), health status of the animal, type of flooring or confinement area, etc. Other animal measurements may include current and estimated lean and fat deposition of a body composition as assessed by molecular tools (e.g., genomics, metabolomics, etc.); health status as determined by molecular markers; and imaging or video data comparisons to measure animal growth rate during a growing period. Such measurements may also be compared to target metrics or measurements (e.g., a target body composition indicating a particular size, shape, fat or muscle mass, etc.).

At operation 302, information is obtained for animal growth and performance targets for an animal population. This information may include a start date and end weight, or an end date to set a growing period. This information may also be derived from data produced from sample data and historical lean growth and total body growth for similar animal populations. Historical lean growth and total body growth may be determined, for instance, by ultrasonic measure of loin depth and backfat, or at slaughter using a variety of measurement tools.

At operation 303, information is processed to identify energy needs for an animal population. The energy needs may include amounts or rates of digestible energy to fulfill net energy and metabolizable energy needs. The energy needs may be calculated based on the specific growth and performance targets for the animal population (e.g., a desired animal size to be reached within a target date range). The energy needs also may be calculated based on the animal and site characteristics.

At operation 304, nutritional requirements for the animal energy needs are identified. These nutritional requirements may include an indication of types of amino acids, lipids, glucose, vitamins, and minerals which provide net energy and metabolizable energy. As indicated in more detail below, such nutritional requirements may also consider ratios and measurements of effective energy used for growth purposes, such as ideal ratios of nitrogenous versus non-nitrogenous energy (e.g., a supply versus demand of nitrogenous compounds). Such ideal ratios may be determined from the energy needs, the animal growth and performance targets, and the animal and site characteristics, noted above.

At operation 305, feed formulations are identified to meet the nutritional requirements. Such formulations may include mixtures of raw materials which are developed or selected to satisfy the nutritional requirements. In addition to nutritional content, the identification and selection of feed formulations may be based on other factors or information (e.g., cost, digestibility, waste, etc.).

Finally, at operation 306, a feed plan is developed, such as through a schedule to deliver the identified feed formulations. Based on the feed plan, at operation 307, an order for manufacture or use of feed formulations may be submitted or communicated. Automated controls for the dispensing or delivery of the feed formulations, based on the schedule, may also be used.

Figure 4:
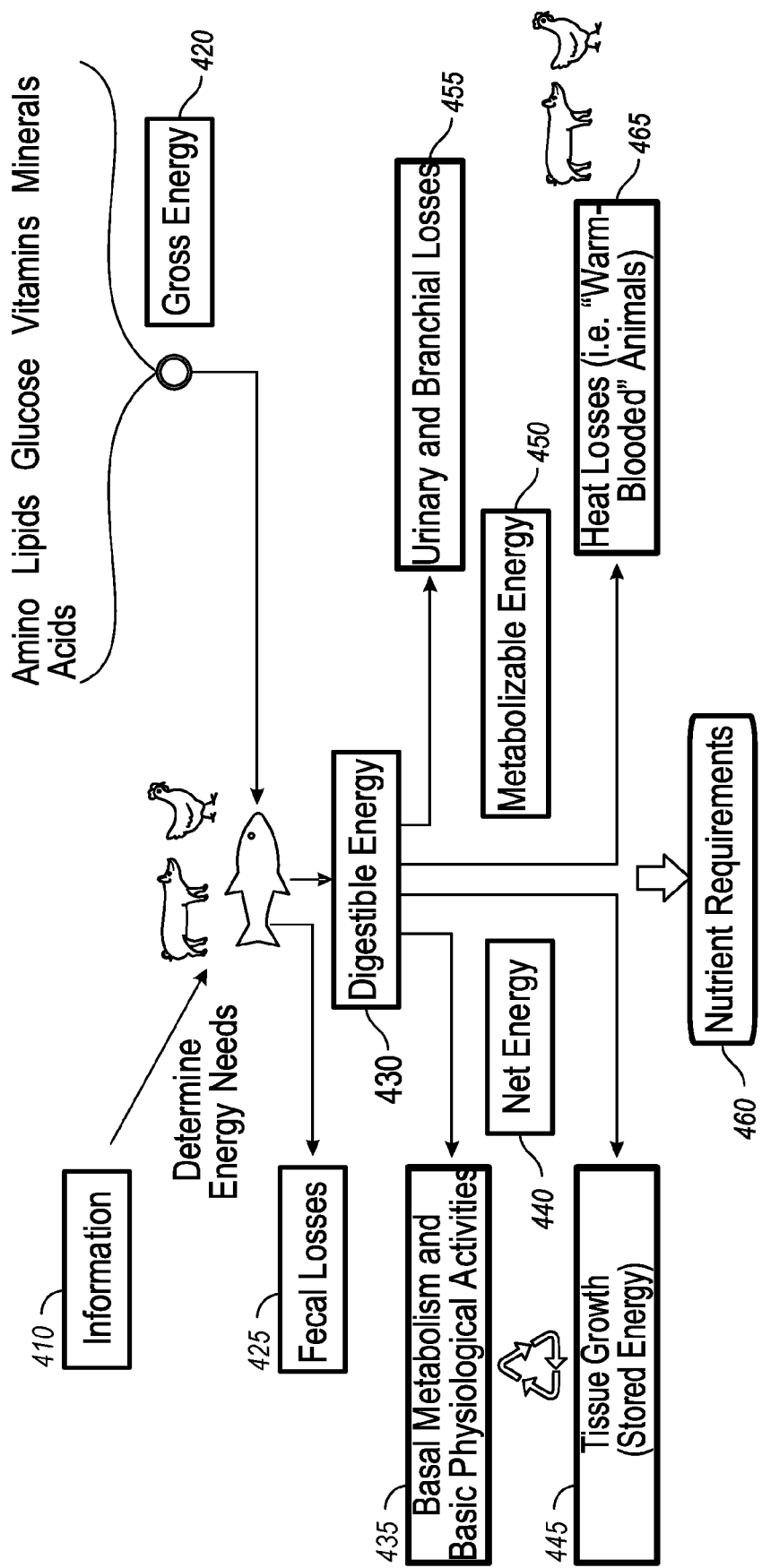
FIG. 4 illustrates relationships among energy and nutrient requirements, according to an example.

FIG. 4 illustrates relationships among energy and nutrient requirements for an animal population. The overall nutrient requirements 460 produced from this process are intended to indicate a minimum requirement for energy that is considered within the method 310 and during operation of the effective energy model 214 for the feed formulation system 210.

As shown, gross energy 420 which is provided from nutrients (e.g., amino acids, lipids, glucose, vitamins, minerals) is provided via feed to an animal population. The animal population is associated by information 410 which indicates variable characteristic of the population or the environment of the population that affect how energy is produced from food. From the consumption of the feed, a portion of the gross energy is expelled from the animal population as fecal losses 425, while the portion of the gross energy that is available from digestion is available as digestible energy 430.

The digestible energy 430 may be further segmented into two portions: metabolizable energy 450, which is used in the animal population with urinary or branchial losses 455 (e.g., urinary losses occurring in warm-blooded animals, and branchial losses occurring in fish) and heat losses 465 (e.g., occurring in warm-blooded animals); and net energy 440, which supports basal metabolism and basic physiological activities 435 and tissue growth 445. Tissue growth 445 can be further segmented into matter (e.g., muscle tissue) growth or stored (e.g., fat tissue) growth. Thus, it will be appreciated that tissue growth 445 is provided from a portion of digestible energy 430, and the growth of meat structure itself on the animal is provided from a portion of this tissue growth. Net energy 440, as will be understood, is a concept developed for land animal species to estimate the energy requirement at the net of all the losses. In contrast, the calculation of "Effective Energy" for tissue growth 445, as discussed herein, is the portion of the gross energy that supports, given the weight gain, the natural, or desired, body composition development across geography, season and size of the animal (including for fish and non-land animal species).

Figure 5:
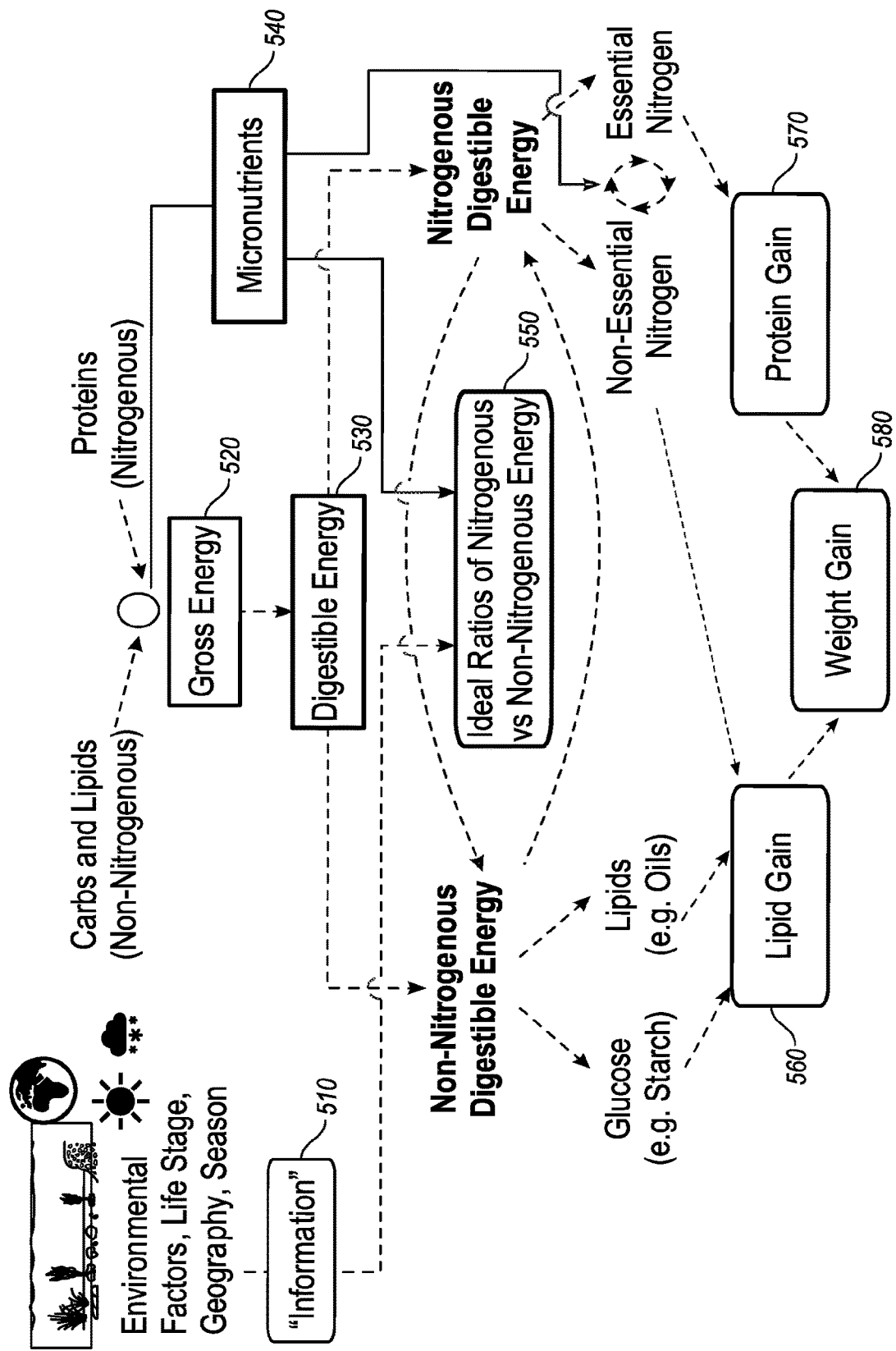
FIG. 5 illustrates further relationships among types of energy and nutritional ingredients, according to an example.

FIG. 5 illustrates further relationships among types of energy and nutritional ingredients. Similar to the depiction of FIG. 4, a portion of gross energy 520 may be segmented into digestible energy 530. However, in this diagram, gross energy 520 is divided into 520 non-nitrogenous sources (e.g., carbohydrates and lipids) and nitrogenous sources (e.g., proteins). This approach allows a calculation of digestible energy 530 to be divided into non-nitrogenous forms, such as non-nitrogenous digestible energy provided from glucose (e.g., starch) and lipids (e.g., oils), versus nitrogenous digestible energy provided from essential nitrogen and non-essential nitrogen.

To properly deliver the appropriate types of digestible energy, feed formulations may be designed to follow ratios of nitrogenous versus non-nitrogenous energy 550 which are dynamically determined from the information 510. The ratios, more specifically, may be based on various internal and external factors of the animal population, including: environmental factors such as seasonality, temperature, and habitat conditions; life stage such as the different amounts of growth at different ages of maturity; genetics; geography and season; and the like.

As shown, non-nitrogenous digestible energy from a feed formulation may be further broken down into glucose (e.g., starch) and lipids (e.g., oils), with such lipids producing lipid gain and growth of fat tissue. Nitrogenous digestible energy, in contrast, may be separated into features of: non-essential nitrogen which contributes to the lipid gain; and essential nitrogen used to increase the protein gain 570 and development of muscle tissue. In combination, the lipid gain 560) and the protein gain 570) produce the weight gain 580 of the animal population. This lipid gain 560 and the protein gain 570) are linked to one another based on the ratios, and thus can be calculated for an animal population based on the ratios 550.

Figure 6:
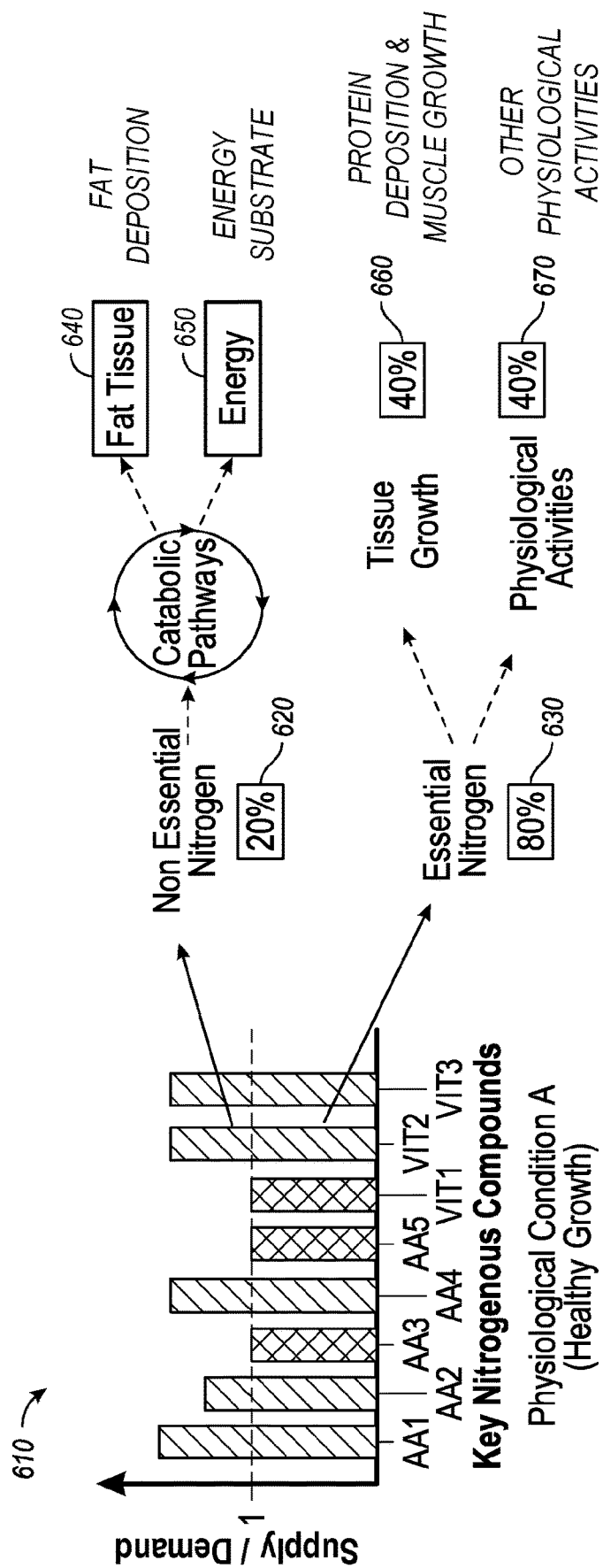
FIG. 6 illustrates a relationship between nitrogenous compounds and energy for a physiological condition of an animal, according to an example.

FIG. 6 illustrates a relationship between nitrogenous compounds and energy for a physiological condition of an animal. Here, an animal population which has a particular physiological condition (e.g., healthy growth) is provided with a plurality of nitrogenous compounds 610 from multiple amino acids and vitamins of a feed formulation. As will be understood, essential amino acids are those that are considered "indispensable" and cannot be newly synthesized by the animal at a rate commensurate with its demand, and thus must be supplied in its diet. Essential amino acids must be supplied in any condition as the animal cannot synthesize them. Conditionally essential are only essential in specific conditions. Non essential amino acids can be synthesized by the animal starting from other substrates. Essential amino acids in a fish diet, for instance, may include, for example: Histidine; Isoleucine; Leucine; Lysine; Methionine; Phenylalanine; Threonine; Tryptophan; and Valine. Conditionally essential amino acids in a fish diet may include, for example: Arginine; Cystine; and Glutamine; Glycine; Proline; and Tyrosine. Non-essential amino acids in a fish diet may include, for example: Alanine; Asparagine; Aspartate; Glutamate; and Serine.

A ratio of supply to demand is also shown for an example set of nitrogenous compounds 610. Certain of the amino acid and vitamin compounds have a ratio over 1, which means that the supply exceeds the demand. Here, the use of a supply and demand ratio, showing nutrients in the same scale, is provided for illustrative purposes. In a real-world setting, a feed formulation may be selected and designed to more closely match or at least meet the demand for each of the nitrogenous compounds.

Values which meet the nitrogenous energy requirement for the animal (demand) are considered "essential" nitrogen 630, whereas values which exceed the demand are considered "non-essential" nitrogen 620. Thus, in this context, essential nitrogen represents the optimal amount and ratio of key nitrogenous compounds needed by the animal, in any given physiological state, to achieve maximum synthesis and deposition of valuable tissue. The ratios between essential and non-essential nitrogen is a moving target, and is directly dependent on the internal and external factors of the animal population (e.g., environment, life state, etc.) as discussed above.

For instance, consider a ratio where a non-essential nitrogen value 620 represents 20 percent of a nutritional compound, while an essential nitrogen value 630 represents 80 percent of a nutritional compound. The non-essential nitrogen is converted with catabolic pathways into fat tissue 640 or energy 650. The essential nitrogen, in contrast, is converted with anabolic pathways into tissue growth 660 and physiological activities 670.

Figure 7:
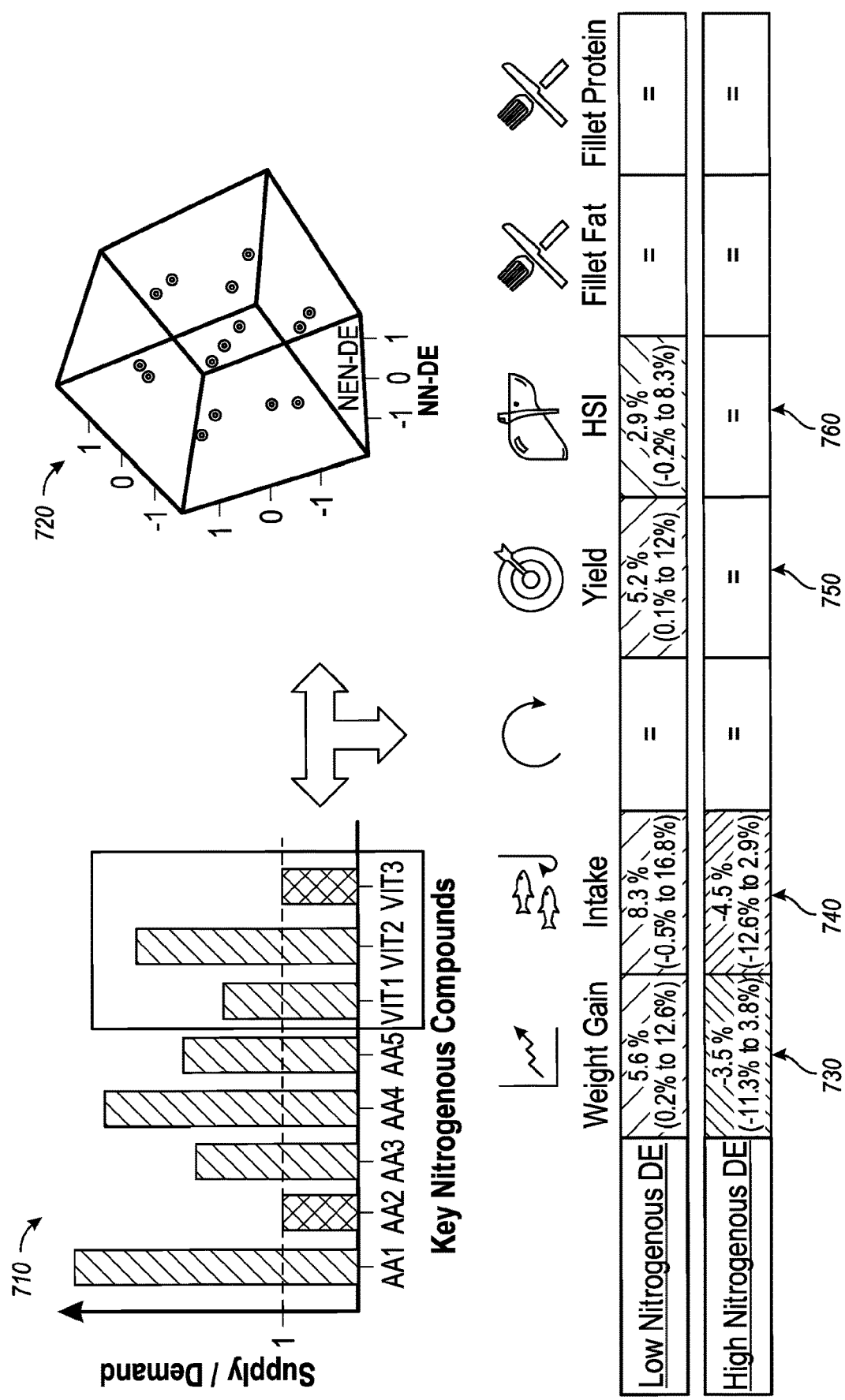
FIG. 7 illustrates a further relationship between nitrogenous compounds and growth conditions of an animal, according to an example.

FIG. 7 illustrates a further relationship between nitrogenous compounds and growth conditions of an animal. As shown, a set of nitrogenous compounds 710 including multiple amino acids and vitamins is represented with various ratios of supply and demand. Such ratios are represented in a three dimensional space 720, plotting data points based on the "non-essential" nitrogenous digestible energy values (NEN-DE) provided from an oversupply of nitrogenous compounds, versus "essential" nitrogenous digestible energy values (EN-DE).

Various data values are shown for weight gain 730, intake 740, yield 750, and a Hyperspectral Imaging measurement 760, are shown. This table demonstrates the result of two trials investigating the effect of vitamins in two feeds with different ratio of Nitrogenous/Non Nitrogenous nutrients. Here, the different numbers represent the effect on certain parameters of adding the same amount of extra vitamins. Accordingly, this shows that in the modeled scenario, the same factor (vitamin addition) can have a different outcome depending on the composition of the feed (i.e. N: non N).

FIGS. 8A to 8D illustrate example uses of an effective energy model 840) to produce a feed formulation schedule 870. The calculation of the feed formulation schedule 870 by the model 840 is based on the generation of a target growth schedule 860, and aspects of calculated nutrition demand 830 and calculated nutrition supply 850, among other factors. FIGS. 8A to 8D also illustrate separate aspects of nutritional information, growth information, environmental information, and physiological conditions which are considered by the model 840. It will be understood that these aspects may be considered in parallel or in series by the model 840. Further, a variety of other data structures, relationships, values, and inputs relating to the calculation of nutrition demand 830 and nutrition supply 850 may also be used or invoked within the model 840.

Figure 8A:
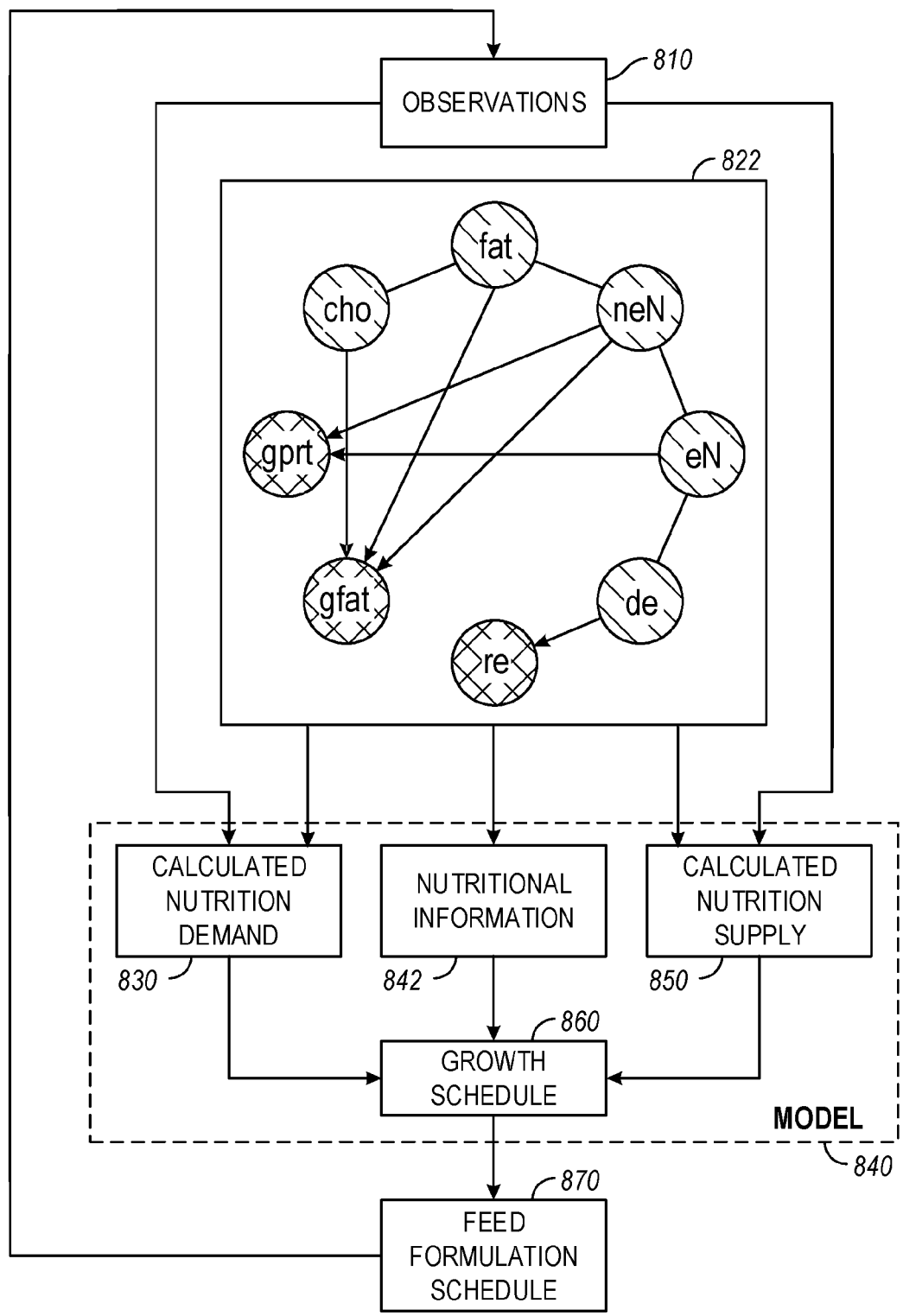
FIG. 8A illustrates energy information evaluated by a model for producing a feed formulation, according to an example.

FIG. 8A illustrates a use of the effective energy model 840 for producing the feed formulation schedule 870. In an example, the data modeling structure 822 of FIG. 8A defines a relationship between the following measurements:
    eN=effective energy value of essential nitrogen
    neN=effective energy value of non-essential nitrogen
    fat=effective energy value of digestible fat
    cho=effective energy value of digestible CHO
    de=digestible energy
    re=retained energy
    gprt=protein gain as energy
    gfat=fat gain as energy In this example, the data modeling structure 822 shows how raw data values collected from various historical samples may be used to calculate nutritional information 842 within a structured statistical model. The nutritional values are further used by the model to modify the calculated nutrition demand 830 and the calculated nutrition supply 850, which can then be applied within a growth schedule 860 for an animal population.

Figure 8B:
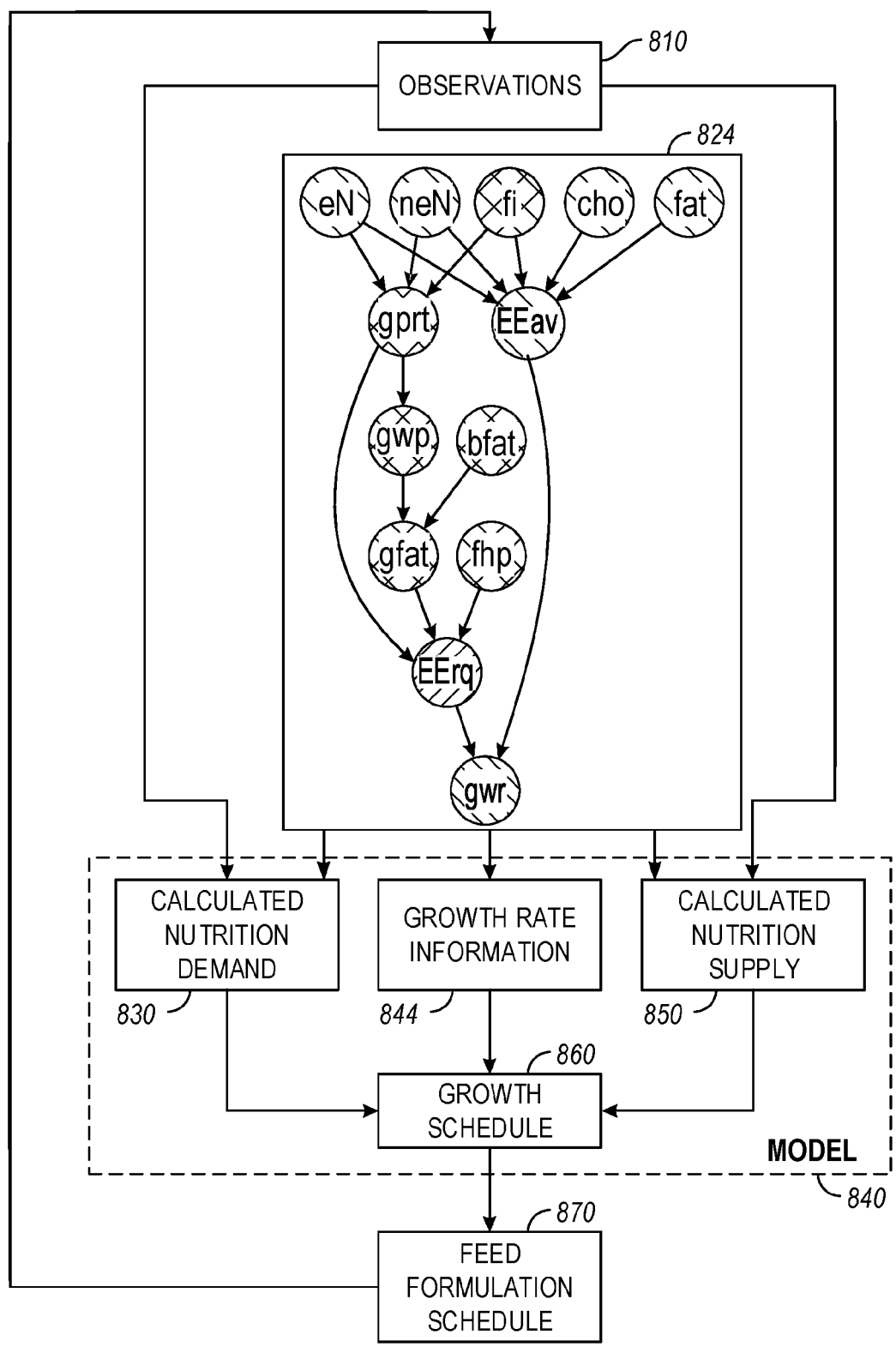
FIG. 8B illustrates growth information evaluated by a model for producing a feed formulation, according to an example.

FIG. 8B illustrates another example system configuration, providing growth rate information 844 to be evaluated by the model 840 for producing the feed formulation schedule 870. Specifically, the growth rate information 844 is produced from inter-dependent effective energy requirements, and is similarly used to assist a determination of the calculated nutrition demand 830 and the calculated nutrition supply 850. In an example, the data structure 824 of FIG. 8B defines a relationship between the following measurements:
    eN=effective energy value of essential nitrogen
    neN=effective energy value of non-essential nitrogen
    fat=effective energy value of digestible fat
    cho=effective energy value of digestible CHO
    de=digestible energy
    re=retained energy
    gprt=protein gain as energy
    gfat=fat gain as energy
    fi=feed intake
    bfat=body fat expectation
    gwp=potential wet weight gain
    fhp=fasting heat production
    EEav=available effective energy from feed and intake
    EErq=required effective energy to meet growth potential
    gwr=apparent wet weight gain with EEav For instance, in the context of the growth of salmon, FIG. 8B shows the relationship between an effective energy requirement and the associated growth of the fish population. The effective energy requirement is then converted to formulation targets for different sizes of fish, latitude and season. Other data points such as feed intake ("fi") and body fat ("bfat") may be produced from other models, which account for water temperature, latitude and season.

Figure 8C:
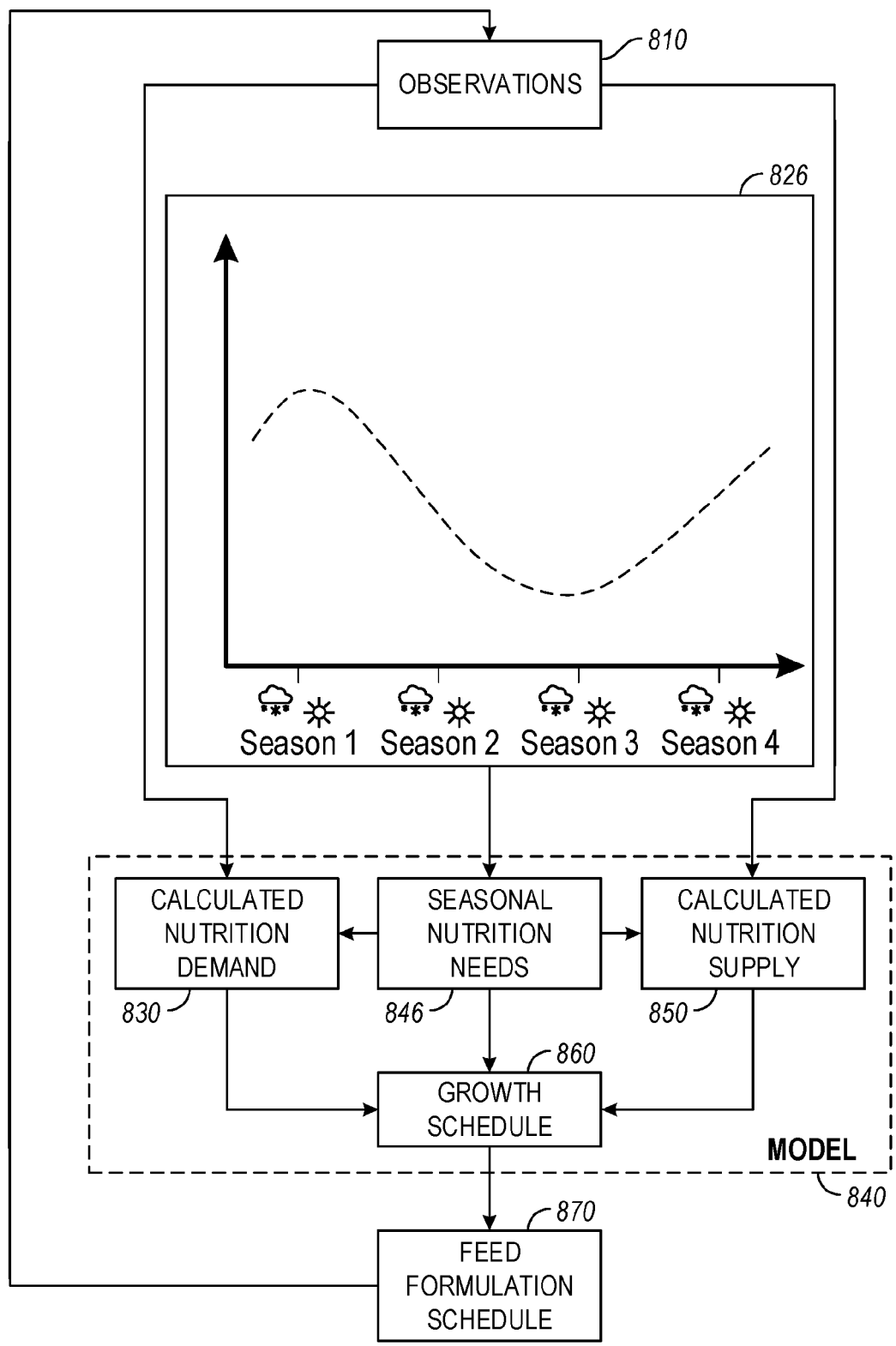
FIG. 8C illustrates seasonality information evaluated by a model for producing a feed formulation, according to an example.

FIG. 8C illustrates another example system configuration, providing seasonality information to be evaluated by the model 840 for producing a feed formulation within the schedule 870. Here, seasonality information is provided in the form of seasonal nutrition need information 846 produced from an evaluation of historical data values at a geographic location among different seasons. Seasonality has effects on an animal's natural or desired body composition development at any time of the year, fish size and geography, as considered by the model 840 and its submodels. The seasonal nutrition need information 846 is used to assist the determination of the calculated nutrition demand 830, the calculated nutrition supply 850, and the growth schedule 860.

Figure 8D:
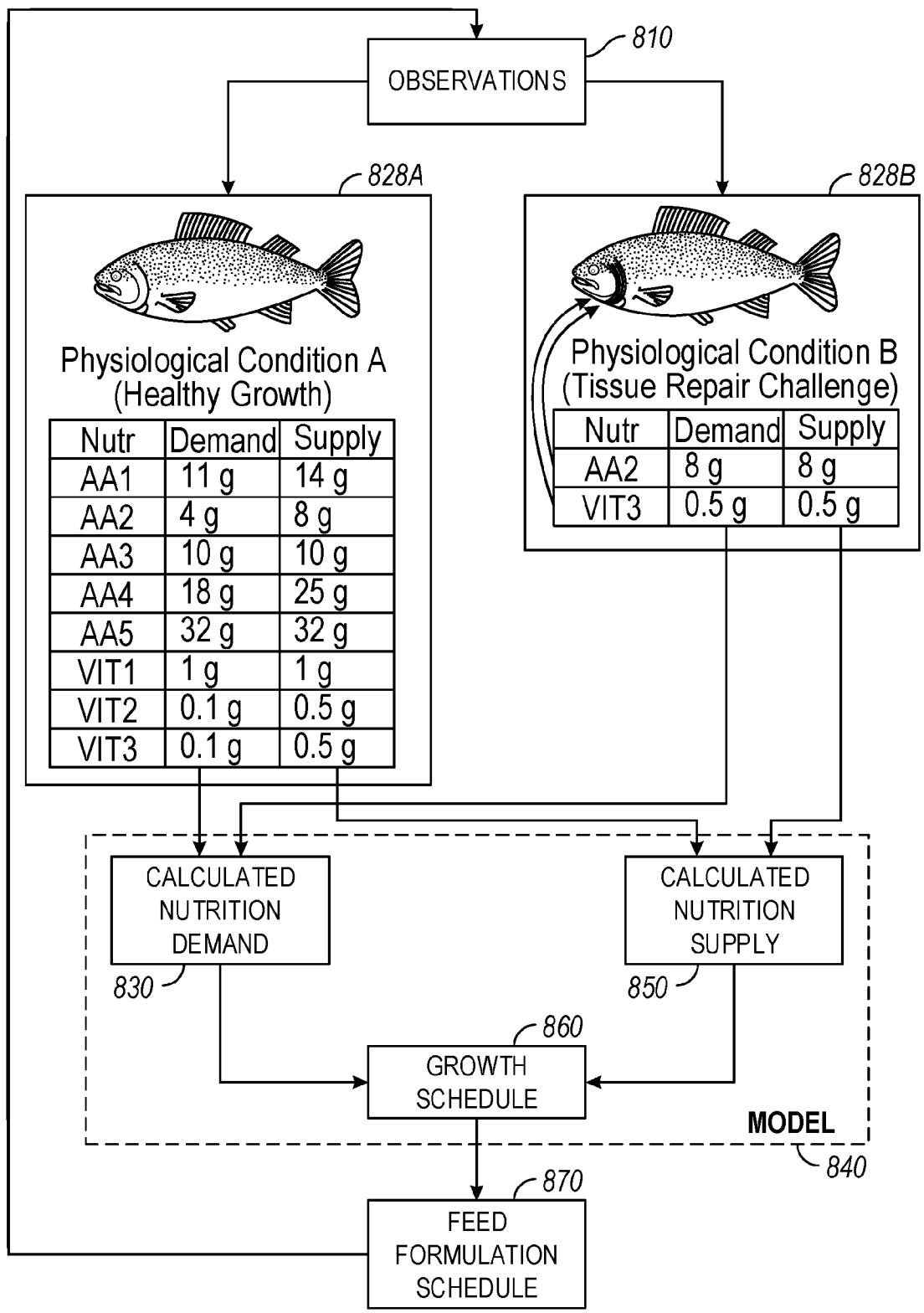
FIG. 8D illustrates physiological condition information evaluated by a model for producing a feed formulation, according to an example.

FIG. 8D illustrates another example system configuration, providing physiological condition information to be evaluated by the model 840 for producing a feed formulation within the schedule 870. Here, two physiological conditions (healthy growth 828A and tissue damage 828B) are illustrated. These separate conditions involve the demand of different nutrients (e.g., to repair damaged tissue), and thus the measurement of what is considered essential or non-essential will change between the conditions. For instance, when considering the "supply/demand" ratio, the change of physiological state of the animal will affect the "demand" part. Thus, the physiological state will change how the entire diet (including essential nitrogen and non-essential nitrogen) will be utilized.

Figure 9:
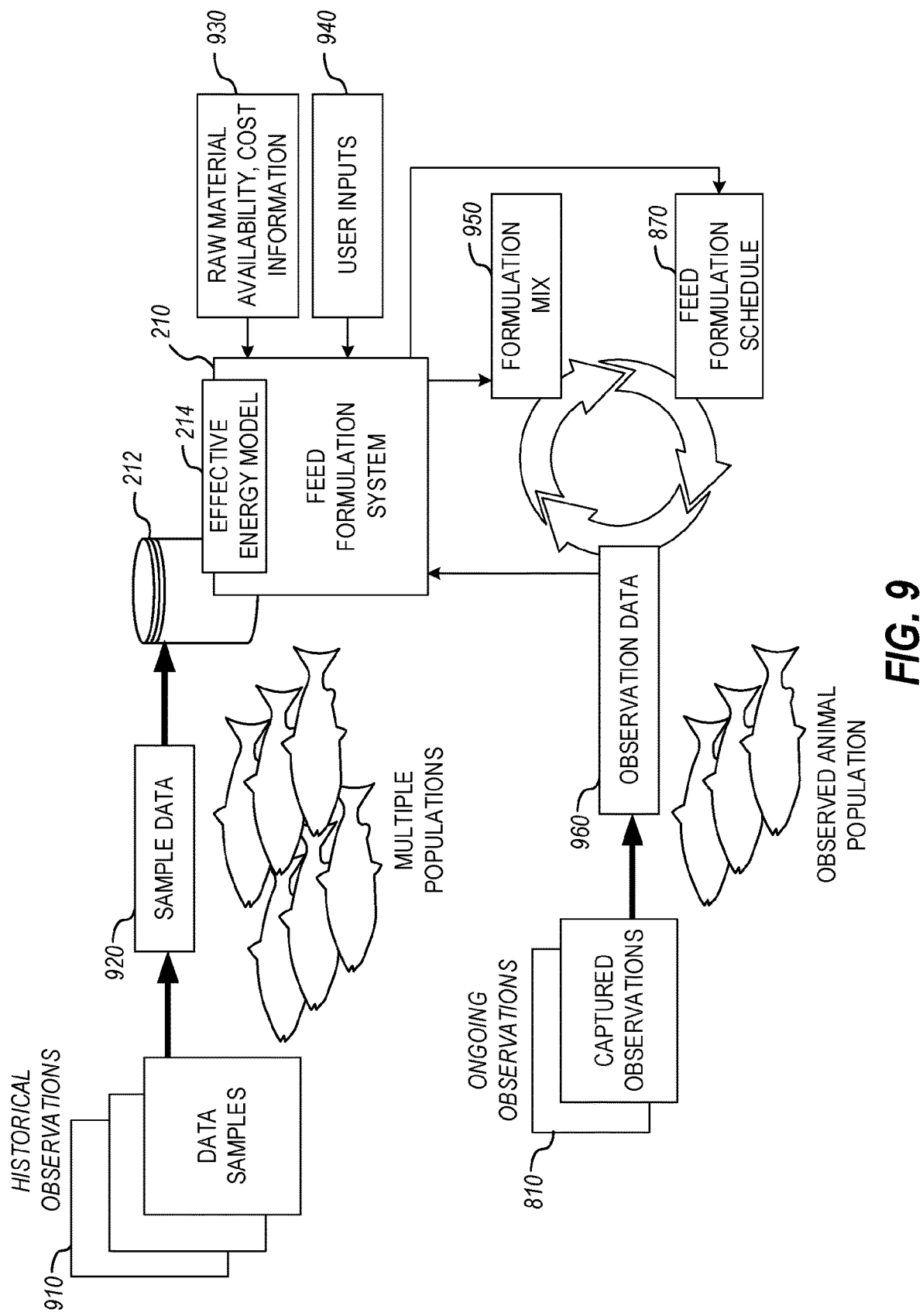
FIG. 9 illustrates a block diagram of functional components involved in use of a feed formulation system to identify and develop updated feed formulations, according to an example.

FIG. 9 illustrates a block diagram of functional components, such as may be implemented within a computing system implementation of the feed formulation system 210, to identify, develop, and update feed formulations using the techniques described herein. In particular, this block diagram shows the relationship between historical observations 910, providing sample data 920 captured from multiple data observations of multiple populations, and ongoing observations 810, providing observation data 960 from a particular observed animal population.

Here, the feed formulation system 210 utilizes the data 212 and the effective energy model 214 as discussed above. However, the use of the feed formulation system 210 is provided with a closed loop (feedback) mechanism, to repeat dynamic data modeling actions at multiple iterations. A current set of observation data 960 is obtained at a repeated interval and provided to the system 210 and model 214 for evaluation. Based on this observation data 960, a particular feed formulation mix 950 is determined, and scheduled for use according to the schedule 870. The observation data 960 may verify compliance with the schedule, and indicate changes that can be propagated in a new or updated instance of the formulation mix 950 and a new or updated feed formulation schedule 870.

Additionally, the feed formulation system 210 may utilize information such as raw material availability or cost information 930, and user inputs 940, to determine new or updated parameters which indicate constraints or restrictions for developing a current iteration of the formulation mix 950 and the feed formulation schedule 870. Thus, as changes and growth occurs in the observed animal population (indicated by observation data 960) and as changes in raw material availability, cost, or user inputs occur (indicated by information 930 or inputs 940), changes to the formulation mix 950 and the feed formulations schedule 870 are provided.

Figure 10:
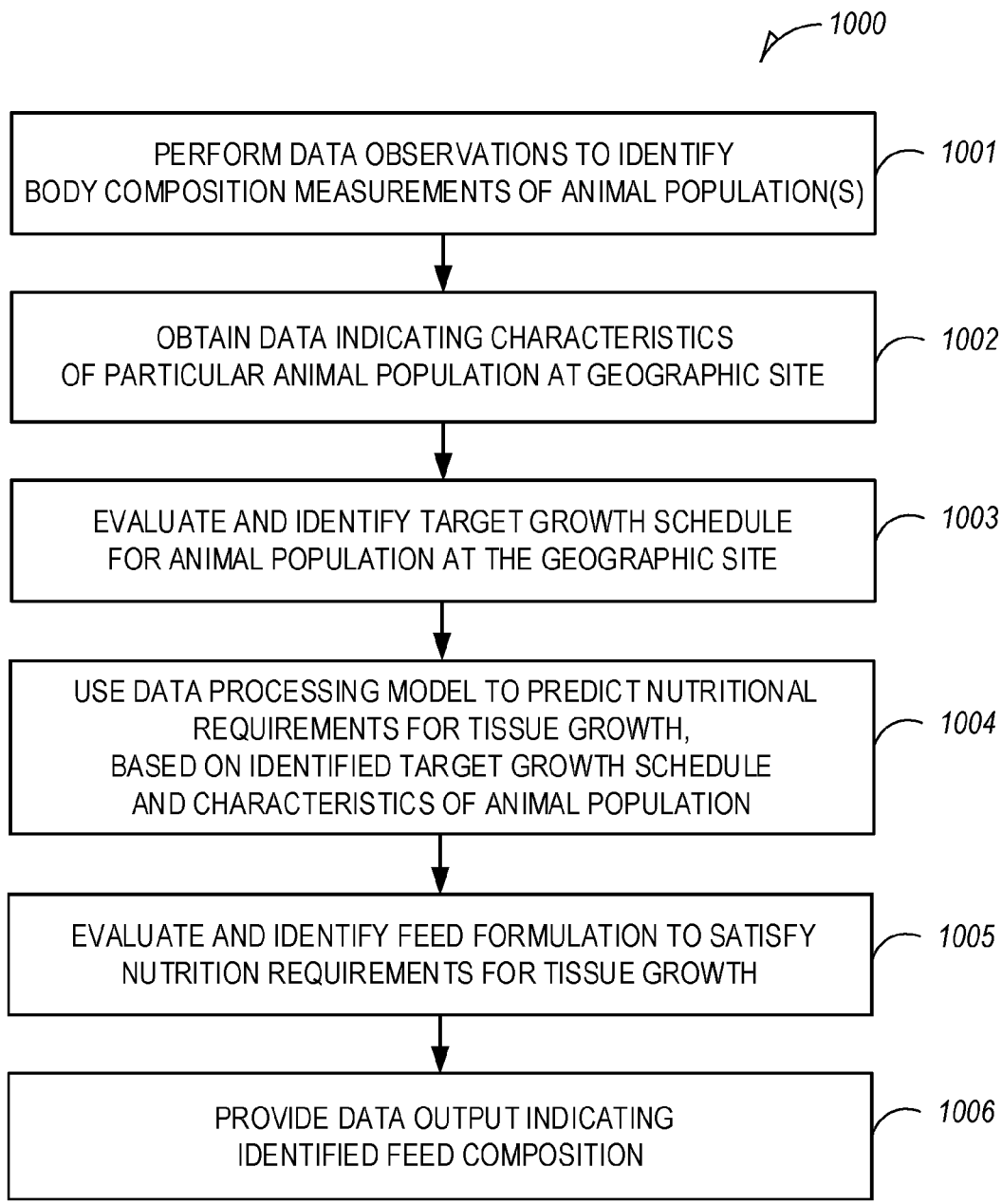
FIG. 10 illustrates a flowchart of a method performed by a computing system for evaluating data for a feed formulation, based on an effective energy data processing model.

FIG. 10 illustrates a flowchart of an example computer-implemented method 1000 for determining an animal feed formulation. It will be understood that the following method 1000 may be implemented by a computing system, computer-readable storage medium having instructions to configure a computing system, and other systems and devices discussed herein. The method 1000 may be adapted for use with a variety of animals, including a class of animals provided from among: fish, crustaceans, swine, lambs, cattle, or poultry, or reptiles.

At operation 1001, data observations are performed to identify current or ongoing body composition measurements of one or more animal population(s). For instance, such observations may be provided in data that indicates body composition measurements or body characteristics of at least a portion of an animal population located at a site. As discussed above, body composition measurements may be captured using near-infrared, ultrasound, or visible imaging, such as where the body composition measurements imaging is used to estimate a weight and a growth condition of the portion of the animal population.

At operation 1002, data is obtained indicating characteristics of a particular animal population at geographic site. In an example, the data that provides characteristics of the animal population includes data for one or more of: geographic latitude of the site; temperature data of the site; a start date for use of the feed composition formulation; or a start weight measurement for the animal population. Also in an example, at least a portion of the obtained data associated the characteristics of an animal population (or, other production or target characteristics) is provided via entry in a user interface.

At operation 1003, a target growth schedule is evaluated and identified for the animal population at the geographic site. In an example, the target growth schedule is identified based on one or more of: a number of production weeks for growth of the animal population; a target weight for the animal population; or a target body composition.

At operation 1004, a data processing model is used to predict nutritional requirements for tissue growth in the animal population, based on identified target growth schedule and the characteristics of animal population. In an example, the data processing model is configured to predict the nutrition requirements based on projected nitrogenous energy requirements for the tissue growth in the animal population, as discussed herein. In a further example, the data processing model is based on a plurality of observations of growth for multiple animal populations, and the observations are collected among multiple seasons and environmental conditions in a geographic area corresponding to the site.

At operation 1005, a feed formulation is evaluated and identified to satisfy nutrition requirements for tissue growth. In an example, the nutrition requirements for the animal population are based on measurements of effective energy determined from a combination of: essential nitrogen, non-essential nitrogen, digestible fat, and digestible starch. In further examples, such an evaluation and identification may be based on identifying and considering cost or usage constraints of the animal feed ingredients that satisfy the nutrition requirements at the target growth schedule. Likewise, in further examples, the data processing model may be adapted to compare the measurements of essential nitrogenous energy from the animal feed ingredients to a calculated requirement of essential nitrogenous energy to satisfy a growth potential of the animal population within the target growth schedule, even as the growth potential of the animal population is limited based on environmental characteristics at the site.

At operation 1006, a data output is provided indicating the identified feed composition. This may include the use of further control, signals, or adaptations of computer, electronic, or mechanical systems.

In a specific example, the animal population comprises fish, and the data that provides characteristics of an animal population is produced from the capture of environmental measurements from the water of the fish production site, associated with at least one of: dissolved oxygen, water temperature, water current, or water salinity. Other relevant factors for fish growth or modeling may also be considered.

Likewise, the data that provides characteristics of the fish population or physiological factors may also be produced from the capture of fish population measurements associated with at least one of: average number of lice or health status of the animal population.

In another specific example, the animal population comprises swine, and the data that provides characteristics of an animal population is produced from the capture of environmental measurements from the swine production site, associated with at least one of: air temperature, humidity, wind speed, air quality, flooring type. Other relevant factors for swine growth or modeling may also be considered. Likewise, the data that provides characteristics of the swine population or physiological factors may also be produced from the capture of swine population measurements associated with at least one of: health status of the swine population, or a genetic profile of the swine population.

Figure 11:
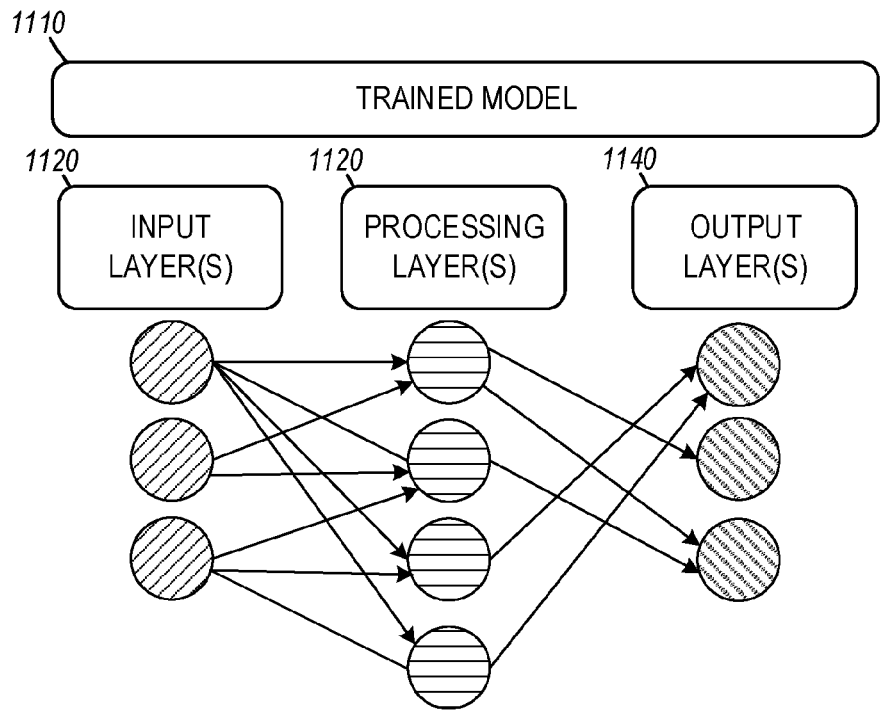
FIG. 11 illustrates a processing flow for a multi-layer data processing model, according to an example.

FIG. 11 illustrates an example multi-layer model for evaluating data. Specifically, FIG. 11 illustrates a multi-layer model layout 1100, having an inputs layer 1102, processing layer 1104, and output layer 1106. In various examples, such a multi-layer model may be used within the effective energy model 214 for the prediction or estimation of feed formulation recommendations, essential nitrogenous energy values, nutritional values, and the like. However, it will be understood that the effective energy model 214 may be based on other algorithms and data processing approaches.

In an example, the inputs layer 1102, processing layer 1104, and output layer 1106 may consider data dependencies and relationships, such as provided with the data models and modeling approaches discussed above. In one example, the model 214 operates such layers with the use of structural equation models (as described with reference to the graphs of FIGS. 8A and 8B). The model may differentiate between input layer data (e.g., eN, neN, fat, cho, de in FIG. 8A for estimating the fuel values, while in FIG. 8B body fat is added as an extra input to apply the system), whereas a processing layer is the intermediate steps and variables shown in FIG. 8A and FIG. 8B that lead to the output layer including gprt, gfat and re in FIG. 8A (even if the modelling interest in FIG. 8A is the get estimates for rht e nutrient fuel values, i.e., path coefficients leading from eN, etc., to gprt, gfat). As shown in FIG. 8B, the outputs are predicted EE requirement and wet weight gain. In another example, the presently described model may be implemented through a neural network system operated as an alternative multivariate method.

In further examples, the multi-layer model or other aspects of the effective energy model 214 may be implemented through use of other artificial intelligence or machine learning techniques (including but not limited to regression algorithms, classification algorithms, neural network algorithms, and the like). Further, the sample data collected from among many animal populations and samples may be used to establish a trained machine learning model. However, a variety of other data processing approaches may also apply.

Figure 12:
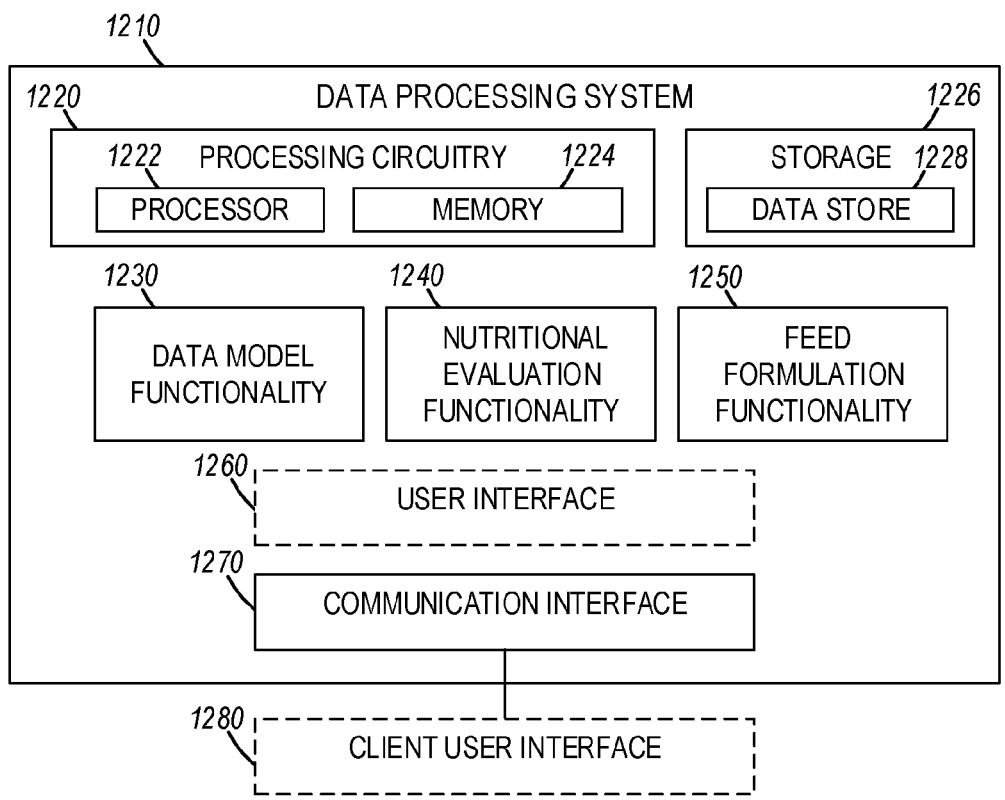
FIG. 12 illustrates a block diagram of a data processing system for implementing the animal nutrition modeling and formulation techniques discussed herein, according to an example.

FIG. 12 illustrates, by way of example, a block diagram of an embodiment of a data processing system 1210 (e.g., a computing system) providing processing circuitry 1220 configured to implement the data processing, modeling, and computation components discussed herein (e.g., with feed formulation system 210). The system 1210 may be operated by and embodied in a number of different computing platforms, such as in a server form factor, a workstation or personal computer form factor, a mobile computing device, etc. In some examples, the system 1210 may be a networked device connected via a network (or combination of networks) to a client computing system operating a user interface 1280 using a communication interface 1270. The network may include local, short-range, or long-range networks, such as Bluetooth, cellular, IEEE 802.11 (Wi-Fi), or other wired or wireless networks.

The system 1210 includes a processor 1222 and a memory 1224, which can be arranged as part of processing circuitry 1220. The processor 1222 may be any single processor or group of processors that act cooperatively. The memory 1224 may be any type of memory, including volatile or non-volatile memory. The memory 1224 may include instructions, which when executed by the processor 1222, cause the processor 1222 to implement the features of the data model functionality 1230, nutritional evaluation functionality 1240, or feed formulation functionality 1250, or related processing features. Thus, the following references to electronic operations in the system 1210 or the processing circuitry 1220 may be performed by the processor 1222 or the circuitry 1220 as a whole. For example, the processor 1222 or circuitry 1220 may implement any of the features of the methods 300 or 1000 or functions described among FIGS. 1 to 2 and FIGS. 4 to 9 for establishing or training a data processing model for identifying feed formulations, utilizing a data processing model for identifying feed formulations, and associated aspects of data capture, inputs, and outputs. These may be implemented using data model functionality components or hardware 1230, nutritional evaluation functionality components or hardware 1240, or feed formulation components or hardware 1250. The processor 1222 or circuitry 1220 may further provide (or obtain) data and commands to assist the processing and implementation using communication interface 1270. It will be understood that the processor 1202 or circuitry 1206 may also implement other aspects of the systems and components described above with reference to the user interfaces and functional operations of FIGS. 1 to 2 and FIGS. 4 to 9.

Figure 13:
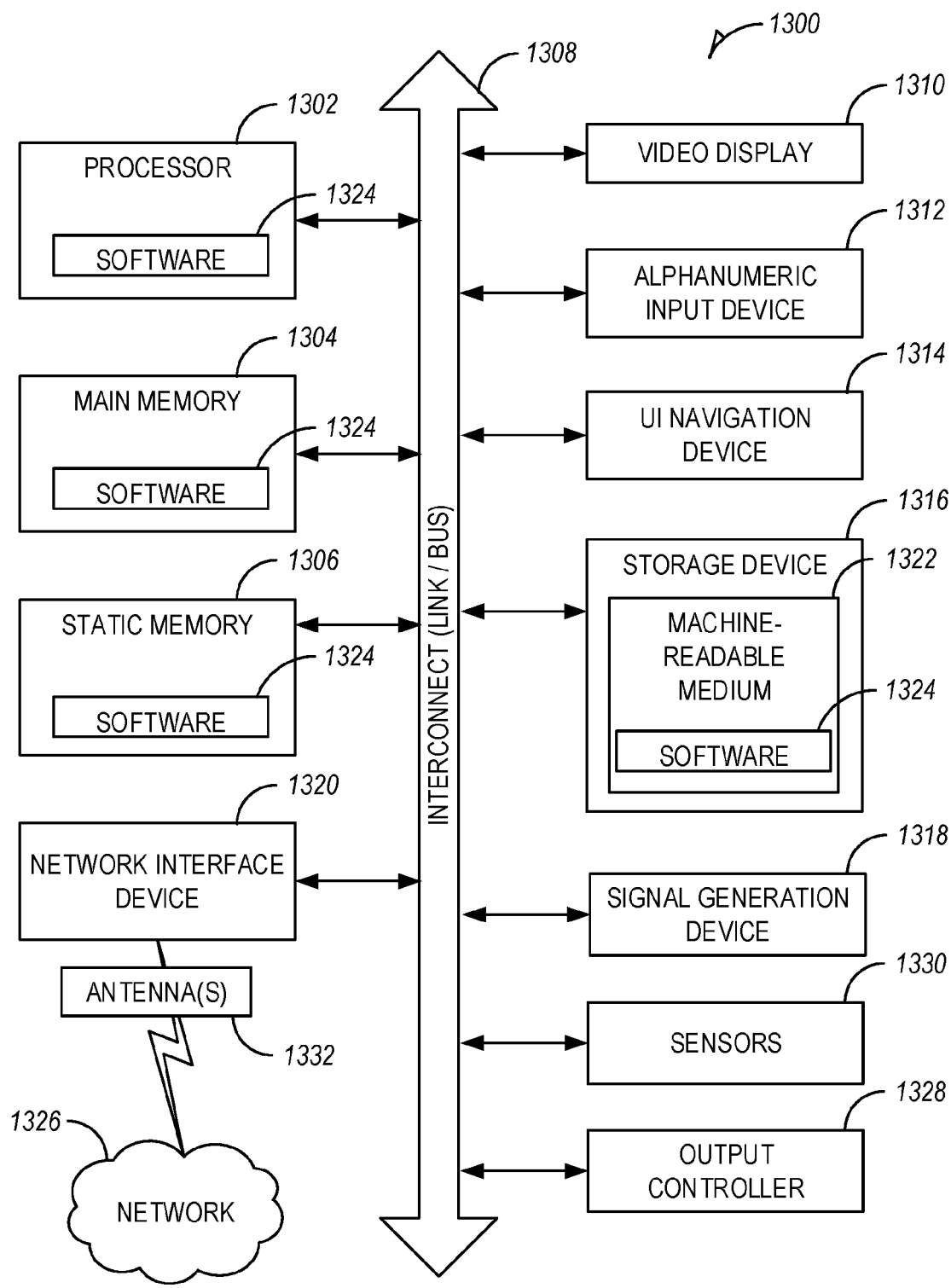
FIG. 13 illustrates a block diagram of an example computing machine upon which any one or more of the techniques or methodologies discussed herein may be implemented.

FIG. 13 illustrates a block diagram of an example computing system machine 1300 upon which any one or more of the techniques (e.g., methodologies) discussed herein may perform. Machine 1300 (e.g., computer system) may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink 1308 (e.g., bus). In some examples, the feed formulation system 210 is provided by an implementation of the machine 1300.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312 (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1330, such as a global positioning system (GPS) sensor, compass, accelerometer, or some other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1302 and/or instructions 1324 may comprise processing circuitry and/or transceiver circuitry.

The mass storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the mass storage device 1316 constitutes, in at least some embodiments, machine readable media.

Specific examples of machine readable media include, one or more of non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1322 is illustrated as a single medium, the term "machine readable medium" includes, in at least some embodiments, a single medium or multiple media (e.g., a centralized or distributed database, and/or associated caches and servers) configured to store the one or more instructions 1324.

An apparatus of the machine 1300 includes, in at least some embodiments, one or more of a hardware processor 1302 (e.g., a central processing unit (CPU), a graphics processing unit (GPU), a hardware processor core, or any combination thereof), a main memory 1304 and a static memory 1306, sensors 1330, network interface device 1320, antennas 1332, a display device 1310, an input device 1312, a UI navigation device 1314, a mass storage device 1316, instructions 1324, a signal generation device 1318, and an output controller 1328. The apparatus is configured, in at least some embodiments, to perform one or more of the methods and/or operations disclosed herein. The apparatus is, in some examples, a component of the machine 1300 to perform one or more of the methods and/or operations disclosed herein, and/or to perform a portion of one or more of the methods and/or operations disclosed herein. In some examples, the apparatus includes, in some embodiments, a pin or other means to receive power. In some embodiments, the apparatus includes power conditioning hardware.

The term "machine readable medium" includes, in some embodiments, any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples include solid-state memories, and optical and magnetic media. Specific examples of machine readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media includes non-transitory machine readable media. In some examples, machine readable media includes machine readable media that is not a transitory propagating signal.

The instructions 1324 are further transmitted or received, in at least some embodiments, over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example embodiment, the network interface device 1320 includes one or more physical jacks (e.g., Ethernet, coaxial, or phone jacks) or one or more antennas to connect to the communications network 1326. In an example embodiment, the network interface device 1320 includes one or more antennas 1332 to wirelessly communicate using at least one of single-input multiple-output (SIMO), multiple-input multiple-output (MIMO), or multiple-input single-output (MISO) techniques. In some examples, the network interface device 1320 wirelessly communicates using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

At least some example embodiments, as described herein, include, or operate on, logic or a number of components, modules, or mechanisms. Such components are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a component that operates to perform specified operations. In an example, the software resides on a machine readable medium. In an example, the software, when executed by the underlying hardware of the component, causes the hardware to perform the specified operations.

Accordingly, such components are understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software, in some embodiments, the general-purpose hardware processor is configured as respective different components at different times. Software accordingly configures a hardware processor, for example, to constitute a particular component at one instance of time and to constitute a different component at a different instance of time.

Some embodiments are implemented fully or partially in software and/or firmware. This software and/or firmware takes the form of instructions contained in or on a non-transitory computer-readable storage medium, in at least some embodiments. Those instructions are then read and executed by one or more hardware processors to enable performance of the operations described herein, in at least some embodiments. The instructions are in any suitable form, such as but not limited to source code, compiled code, interpreted code, executable code, static code, dynamic code, and the like. Such a computer-readable medium includes any tangible non-transitory medium for storing information in a form readable by one or more computers, such as but not limited to read only memory (ROM); random access memory (RAM); magnetic disk storage media; optical storage media; flash memory, etc.

Various embodiments may be implemented fully or partially in software and/or firmware. This software and/or firmware may take the form of instructions contained in or on a non-transitory computer-readable storage medium. Those instructions are then read and executed by one or more processors to enable performance of the operations described herein. The instructions are in any suitable form, such as but not limited to source code, compiled code, interpreted code, executable code, static code, dynamic code, and the like. Such a computer-readable medium includes, in at least some embodiments, any tangible non-transitory medium for storing information in a form readable by one or more computers, such as but not limited to read only memory (ROM); random access memory (RAM); magnetic disk storage media; optical storage media; flash memory, etc.

What is claimed is:

1. A computer-implemented method for determining an animal feed formulation, comprising:
    obtaining data that provides characteristics of an animal population located at a site;
    identifying a target growth schedule for the animal population;
    using a data processing model to predict nutrition requirements for tissue growth in the animal population, using the target growth schedule and the characteristics of the animal population, the data processing model configured to predict the nutrition requirements based on projected nitrogenous energy requirements for the tissue growth in the animal population;
    identifying a feed formulation, the feed formulation producible from a combination of animal feed ingredients to satisfy the nutrition requirements for tissue growth in the animal population; and
    generating a data output for use of the feed formulation with the animal population, the data output indicating the identified feed formulation producible from the combination of animal feed ingredients.

2. The method of claim 1, wherein the data that provides characteristics of the animal population includes data for one or more of:
    geographic latitude of the site;
    temperature data of the site;
    a start date for use of the feed formulation; or
    a start weight measurement for the animal population.

3. The method of claim 1, wherein the target growth schedule is identified based on one or more of:
    a number of production weeks for growth of the animal population;
    a target weight for the animal population; or
    a target body composition.

4. The method of claim 1, wherein obtaining data comprises capturing body composition measurements from at least a portion of the animal population using near-infrared, ultrasound, or visible imaging, and wherein the body composition measurements imaging is used to estimate a weight and a growth condition of the portion of the animal population.

5. The method of claim 4, wherein the animal population comprises fish, and wherein obtaining data further comprises capturing environmental measurements associated with at least one of: dissolved oxygen, water temperature, water current, or water salinity; and
    wherein obtaining data further comprises capturing population measurements associated with at least one of: average number of lice, or health status of the animal population.

6. The method of claim 4, wherein the animal population comprises swine, and wherein obtaining data further comprises capturing environmental measurements associated with at least one of: air temperature, humidity, wind speed, air quality, flooring type; and
    wherein obtaining data further comprises capturing population measurements associated with at least one of: health status of the animal population, or a genetic profile of the animal population.

7. The method of claim 1, wherein the data processing model is based on a plurality of observations of growth for multiple animal populations, the observations collected among multiple seasons and environmental conditions in a geographic area corresponding to the site.

8. The method of claim 1, wherein the nutrition requirements for the animal population are based on measurements of effective energy determined from a combination of: essential nitrogen, non-essential nitrogen, digestible fat, and digestible starch.

9. The method of claim 1, the method further comprising:
    identifying cost or usage constraints of the animal feed ingredients;
    wherein identifying animal feed ingredients to satisfy the nutrition requirements at the target growth schedule further includes use of the identified cost or usage constraints.

10. The method of claim 9, wherein the model compares measurements of essential nitrogenous energy from the animal feed ingredients to a calculated requirement of essential nitrogenous energy to satisfy a growth potential of the animal population within the target growth schedule, and wherein the growth potential of the animal population is limited based on environmental characteristics at the site.

11. A non-transitory computer-readable storage medium comprising instructions that, when executed, configure hardware processing circuitry of a computing system to perform operations comprising:
    obtaining data that provides characteristics of an animal population located at a site;
    identifying a target growth schedule for the animal population;
    using a data processing model to predict nutrition requirements for tissue growth in the animal population, using the target growth schedule and the characteristics of the animal population, the data processing model configured to predict the nutrition requirements based on projected nitrogenous energy requirements for the tissue growth in the animal population;

identifying a feed formulation, the feed formulation producible from a combination of animal feed ingredients to satisfy the nutrition requirements for tissue growth in the animal population; and generating a data output for use of the feed formulation with the animal population, the data output indicating the identified feed formulation producible from the combination of animal feed ingredients.

12. The computer-readable storage medium of claim 11, wherein the data that provides characteristics of the animal population includes data for one or more of:
   geographic latitude of the site;
   temperature data of the site;
   a start date for use of the feed formulation; or
   a start weight measurement for the animal population; and
wherein the target growth schedule is identified based on one or more of:
   a number of production weeks for growth of the animal population;
   a target weight for the animal population; or
   a target body composition.

13. The computer-readable storage medium of claim 12, wherein obtaining data comprises capturing body composition measurements from at least a portion of the animal population,
   wherein the body composition measurements are captured using near-infrared, ultrasound, or visible imaging, and
   wherein the body composition measurements imaging is used to estimate a weight and a growth condition of the portion of the animal population.

14. The computer-readable storage medium of claim 12, wherein the data processing model is based on a plurality of observations of growth for multiple animal populations, the observations collected among multiple seasons and environmental conditions in a geographic area corresponding to the site;
   wherein the model compares measurements of essential nitrogenous energy to a calculated requirement of essential nitrogenous energy to satisfy a growth potential of the animal population within the target growth schedule; and
   wherein the growth potential of the animal population is limited based on environmental characteristics at the site.

15. A computing system, comprising:
   memory storing:
      data comprising characteristics of an animal population located at a site;
      data comprising a target growth schedule for the animal population; and
      data comprising a data processing model, configured to predict nutritional requirements for tissue growth in the animal population; and
   processing circuitry configured to determine an animal feed composition by performing operations comprising:
      obtaining data that provides characteristics of an animal population located at a site;
      identifying a target growth schedule for the animal population;
      using a data processing model to predict nutrition requirements for tissue growth in the animal population, using the target growth schedule and the characteristics of the animal population, the data processing model configured to predict the nutrition requirements based on projected nitrogenous energy requirements for the tissue growth in the animal population;
      identifying a feed formulation, the feed formulation producible from a combination of animal feed ingredients to satisfy the nutrition requirements for tissue growth in the animal population; and
      generating a data output for use of the feed formulation with the animal population, the data output indicating the identified feed formulation producible from the combination of animal feed ingredients.

16. The computing system of claim 15,
wherein the data that provides characteristics of the animal population includes data for one or more of:
   geographic latitude of the site;
   temperature data of the site;
   a start date for use of the feed formulation; or
   a start weight measurement for the animal population; and
wherein the target growth schedule is identified based on one or more of:
   a number of production weeks for growth of the animal population;
   a target weight for the animal population; or
   a target body composition.

17. The computing system of claim 15, wherein obtaining data comprises capturing body composition measurements from at least a portion of the animal population,
   wherein the body composition measurements are captured using near-infrared, ultrasound, or visible imaging, and
   wherein the body composition measurements imaging is used to estimate a weight and a growth condition of the portion of the animal population.

18. The computing system of claim 15, wherein the data processing model is based on a plurality of observations of growth for multiple animal populations, the observations collected among multiple seasons and environmental conditions in a geographic area corresponding to the site;
   wherein the model compares measurements of essential nitrogenous energy from the animal feed ingredients to a calculated requirement of essential nitrogenous energy to satisfy a growth potential of the animal population within the target growth schedule; and
   wherein the growth potential of the animal population is limited based on environmental characteristics at the site.

19. The computing system of claim 15, further comprising:
   a communications device configured to provide at least one application programming interface for access by a client computing system, wherein the memory is configured to store instructions and the processing circuitry is configured to execute the instructions, wherein the instructions, when executed, cause the computing system to operate the at least one application programming interface to determine the animal feed composition.

20. The computing system of claim 15, further comprising:
   a display device;
   a storage device configured to store instructions; and
   processing circuitry configured to execute the instructions, wherein the instructions, when executed, cause the computing system to present a user interface via the display device, and determine the animal feed composition by using the data processing model.

\* \* \* \* \*